(12) United States Patent
Chen et al.

(10) Patent No.: US 11,153,821 B2
(45) Date of Patent: *Oct. 19, 2021

(54) APPARATUS, SYSTEM AND METHOD OF ACKNOWLEDGING A MULTI USER (MU) MULTIPLE-INPUT-MULTIPLE-OUTPUT (MIMO) (MU-MIMO) TRANSMISSION

(71) Applicant: INTEL IP CORPORATION, Santa Clara, CA (US)

(72) Inventors: Cheng Chen, Portland, OR (US); Carlos Cordeiro, Portland, OR (US); Claudio Da Silva, Portland, OR (US); Oren Kedem, Modiin Maccabim-Reut (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/625,744

(22) PCT Filed: Jun. 17, 2018

(86) PCT No.: PCT/US2018/037961
§ 371 (c)(1),
(2) Date: Dec. 22, 2019

(87) PCT Pub. No.: WO2018/236694
PCT Pub. Date: Dec. 27, 2018

(65) Prior Publication Data
US 2021/0068051 A1 Mar. 4, 2021

Related U.S. Application Data

(60) Provisional application No. 62/523,380, filed on Jun. 22, 2017.

(51) Int. Cl.
*H04W 52/02* (2009.01)
*H04B 7/0452* (2017.01)
(Continued)

(52) U.S. Cl.
CPC ...... *H04W 52/0216* (2013.01); *H04B 7/0452* (2013.01); *H04W 72/085* (2013.01); *H04W 80/02* (2013.01)

(58) Field of Classification Search
CPC .......... H04W 52/0216; H04W 72/085; H04W 80/02; H04W 52/02; H04B 7/0452; Y02D 30/70
See application file for complete search history.

(56) References Cited

U.S. PATENT DOCUMENTS

2012/0188923 A1  7/2012  Kwon et al.
2013/0301569 A1  11/2013  Wang et al.
(Continued)

OTHER PUBLICATIONS

IEEE Standard for Information technology—Part 11: Wireless LAN Medium Access Control (MAC) and Physical Layer (PHY) Specifications; IEEE Std 802.11 ™-2016 (Year: 2016).*
(Continued)

*Primary Examiner* — Hassan A Phillips
*Assistant Examiner* — Mohammed S Chowdhury
(74) *Attorney, Agent, or Firm* — Shichrur & Co.

(57) ABSTRACT

For example, an EDMG STA may be configured to receive an A-MPDU for the EDMG STA in an EDMG MU PPDU from an EDMG MU-MIMO initiator station; to determine, according to an ordered acknowledgement scheme, a Block Acknowledgement (BA) period in which the EDMG STA is to be awake to allow transmission of a BA from the EDMG STA to the EDMG MU-MIMO initiator STA; to allow the EDMG STA to be in a power save mode during a first power save period from a time of an End of Frame (EOF) field in the A-MPDU for the EDMG STA until a beginning of the
(Continued)

BA period; to transmit the BA to the EDMG MU-MIMO initiator; and to allow the EDMG STA to be in the power save mode during a second power save period after transmission of the BA.

22 Claims, 8 Drawing Sheets

(51) Int. Cl.
*H04W 72/08* (2009.01)
*H04W 80/02* (2009.01)

(56) References Cited

U.S. PATENT DOCUMENTS

| | | | | |
|---|---|---|---|---|
| 2016/0197755 | A1* | 7/2016 | Barriac | H04L 27/2613 370/350 |
| 2016/0285608 | A1 | 9/2016 | Kwon et al. | |
| 2016/0323861 | A1 | 11/2016 | Cordeiro et al. | |
| 2016/0330007 | A1 | 11/2016 | Cherian et al. | |
| 2016/0330714 | A1 | 11/2016 | Hedayat | |
| 2017/0048048 | A1* | 2/2017 | Seok | H04L 5/0007 |
| 2018/0302825 | A1* | 10/2018 | Trainin | H04L 1/1835 |
| 2018/0316476 | A1 | 11/2018 | Sugaya | |
| 2019/0068271 | A1* | 2/2019 | Lou | H04B 7/0684 |
| 2019/0123798 | A1* | 4/2019 | Lou | H04B 7/0486 |
| 2019/0223253 | A1* | 7/2019 | Sakamoto | H04W 28/06 |
| 2020/0067577 | A1* | 2/2020 | Lou | H04W 74/002 |
| 2020/0162135 | A1* | 5/2020 | Sun | H04B 17/318 |
| 2020/0228294 | A1 | 7/2020 | Chen et al. | |
| 2021/0028831 | A1* | 1/2021 | Lou | H04B 7/0417 |

OTHER PUBLICATIONS

IEEE P802.11aj™/D6.0; Part 11: Wireless LAN Medium Access Control (MAC) and Physical Layer (PHY) specifications Amendment 5: Enhancements for Very High Throughput to Support Chinese Millimeter Wave; IEEE P802.11aj™D6.0, Jun. 2017 (Year: 2017).*
3GPP TSG RAN WG1 Meeting #94bis;R1-1810453; Chengdu, China, Oct. 8-12, 2018 (Year: 2018).*
3GPP TSG RAN WG1 Meeting #94bis; R1-1810137; Chengdu, China, Oct. 8-12, 2018 (Year: 2018).*
International Preliminary Report on Patentability for International Application No. PCT/US2018/037961, dated Jan. 2, 2020, 8 pages.
International Search Report and the Written Opinion for International Application No. PCT/US2018/037961, dated Nov. 26, 2018, 11 pages.
IEEE Std 802.11™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.
Office Action for U.S. Appl. No. 16/831,462, dated Jun. 1, 2021, 37 pages.

* cited by examiner

US 11,153,821 B2

APPARATUS, SYSTEM AND METHOD OF ACKNOWLEDGING A MULTI USER (MU) MULTIPLE-INPUT-MULTIPLE-OUTPUT (MIMO) (MU-MIMO) TRANSMISSION

CROSS REFERENCE

This application claims the benefit of and priority from US Provisional Patent Application No. 62/523,380 entitled "APPARATUS, SYSTEM AND METHOD OF COMMUNICATING A MULTI USER (MU) MULTIPLE-INPUT-MULTIPLE-OUTPUT (MIMO) (MU-MIMO) TRANSMISSION", filed Jun. 22, 2017, the entire disclosure of which is incorporated herein by reference.

TECHNICAL FIELD

Embodiments described herein generally relate to acknowledging a Multi User (MU) Multiple-Input-Multiple-Output (MIMO) (MU-MIMO) transmission.

BACKGROUND

A wireless communication network in a millimeter-wave band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
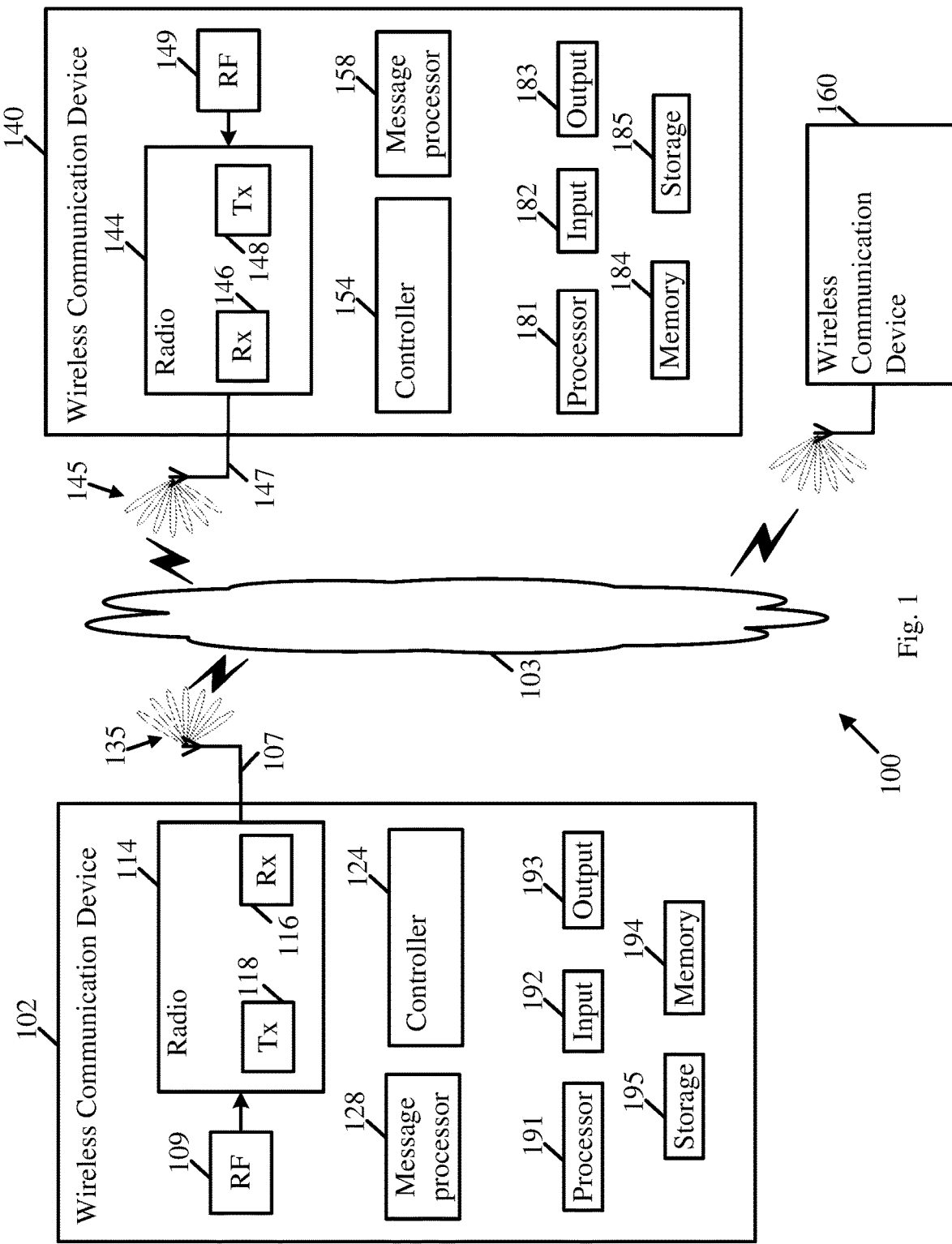
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016); and/or IEEE 802.11ay (P802.11ay/D1.0 Draft Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications—Amendment 7: Enhanced Throughput for Operation in License-Exempt Bands Above 45 GHz, November 2017)) and/or future versions and/or derivatives thereof, devices and/or networks operating in accordance with existing WFA Peer-to-Peer (P2P) specifications (WiFi P2P technical specification, version 1.7, Jul. 6, 2016) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band above 45 Gigahertz (GHz), e.g., 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHz, a frequency band above 45 GHz, a 5G frequency band, a frequency band below 20 GHz, e.g., a Sub 1 GHz (S1G) band, a 2.4 GHz band, a 5 GHz band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, a wireless communication device 160, and/or one or more other devices.

In some demonstrative embodiments, devices 102, 140 and/or 160 may include a mobile device or a non-mobile, e.g., a static, device.

For example, devices 102, 140 and/or 160 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or devices 140 and/or 160 may include, for example, one or more of a processor 181, an input unit 182, an output unit 183, a memory unit 184, and/or a storage unit 185. Devices 102, 140 and/or 160 may optionally include other suitable hardware components and/or software components. In some demonstrative embodiments, some or all of the components of one or more of devices 102, 140 and/or 160 may be enclosed in a common housing or packaging, and may be interconnected or operably associated using one or more wired or wireless links. In other embodiments, components of one or more of devices 102, 140 and/or 160 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 140 and/or 160 may be capable of communicating content, data, information and/or signals via a wireless medium (WM) 103. In some demonstrative embodiments, wireless medium 103 may include, for example, a radio channel, a cellular channel, an RF channel, a WiFi channel, a 5G channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In other embodiments, WM 103 may include any other type of channel over any other frequency band.

In some demonstrative embodiments, device 102, device 140 and/or device 160 may include one or more radios including circuitry and/or logic to perform wireless communication between devices 102, 140, 160 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, a 5G band, and/or any other band, for example, a 2.4 GHz band, a 5 GHz band, a S1G band, and/or any other band.

In some demonstrative embodiments, radios 114 and/or 144 may include, or may be associated with one or more, e.g., a plurality of, directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be included as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be included as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 160 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 128 may be configured to perform any other additional or alternative functionality and/or may include any other additional or alternative components to generate and/or process a message to be transmitted.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 158 may be configured to perform any other additional or alternative functionality and/or may include any other additional or alternative components to generate and/or process a message to be transmitted.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102, device 140 and/or device 160 may include, operate as, perform the role of, and/or perform one or more functionalities of, one or more STAs. For example, device 102 may include at least one STA, and/or device 140 may include at least one STA.

In some demonstrative embodiments, device 102, device 140 and/or device 160 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, devices 102, 140 and/or 160 may include, operate as, perform the role of, and/or perform one or more functionalities of, any other wireless device and/or station, e.g., a WLAN STA, a WiFi STA, and the like.

In some demonstrative embodiments, device 102, device 140 and/or device 160 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102, device 140 and/or device 160 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102, device 140 and/or device 160 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments devices 102, 140 and/or 160 may be configured to communicate over a Next Generation 60 GHz (NG60) network, an Enhanced DMG (EDMG) network, and/or any other network. For example, devices 102, 140 and/or 160 may perform Multiple-Input-Multiple-Output (MIMO) communication, for example, for communicating over the NG60 and/or EDMG networks, e.g., over an NG60 or an EDMG frequency band.

In some demonstrative embodiments, devices 102, 140 and/or 160 may be configured to operate in accordance with one or more Specifications, for example, including one or more IEEE 802.11 Specifications, e.g., an IEEE 802.11-2016 Specification, an IEEE 802.11ay Specification, and/or any other specification and/or protocol.

Some demonstrative embodiments may be implemented, for example, as part of a new standard in an mmWave band, e.g., a 60 GHz frequency band and/or any other directional band, for example, as an evolution of an IEEE 802.11-2016 Specification and/or an IEEE 802.11ad Specification.

In some demonstrative embodiments, devices 102, 140 and/or 160 may be configured according to one or more standards, for example, in accordance with an IEEE 802.11ay Standard, which may be, for example, configured to enhance the efficiency and/or performance of an IEEE 802.11ad Specification, which may be configured to provide Wi-Fi connectivity in a 60 GHz band.

Some demonstrative embodiments may enable, for example, to significantly increase the data transmission rates defined in the IEEE 802.11ad Specification, for example, from 7 Gigabit per second (Gbps), e.g., up to 30 Gbps, or to any other data rate, which may, for example, satisfy growing demand in network capacity for new coming applications.

Some demonstrative embodiments may be implemented, for example, to allow increasing a transmission data rate, for example, by applying MIMO and/or channel bonding techniques.

In some demonstrative embodiments, devices 102, 140 and/or 160 may be configured to communicate MIMO communications over the mmWave wireless communication band.

In some demonstrative embodiments, device 102, device 140 and/or device 160 may be configured to support one or more mechanisms and/or features, for example, channel bonding, Single User (SU) MIMO, and/or Multi-User (MU) MIMO, for example, in accordance with an IEEE 802.11ay Standard and/or any other standard and/or protocol.

In some demonstrative embodiments, device 102, device 140 and/or device 160 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In some demonstrative embodiments, devices 102, 140 and/or 160 may implement a communication scheme, which may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, SU MIMO techniques, and/or MU-MIMO techniques.

In some demonstrative embodiments, devices 102, 140 and/or 160 may be configured to implement one or more mechanisms, which may be configured to enable SU and/or MU communication of Downlink (DL) and/or Uplink frames (UL) using a MIMO scheme.

In some demonstrative embodiments, device 102, device 140 and/or device 160 may be configured to implement one or more MU communication mechanisms. For example, devices 102, 140 and/or 160 may be configured to implement one or more MU mechanisms, which may be configured to enable MU communication of DL frames using a MIMO scheme, for example, between a device, e.g., device 102, and a plurality of devices, e.g., including device 140, device 160, and/or one or more other devices.

In some demonstrative embodiments, devices 102, 140 and/or 160 may be configured to communicate over an NG60 network, an EDMG network, and/or any other network and/or any other frequency band. For example, devices 102, 140 and/or 160 may be configured to communicate DL MIMO transmissions and/or UL MIMO transmissions, for example, for communicating over the NG60 and/or EDMG networks.

Some wireless communication Specifications, for example, the IEEE 802.11ad-2012 Specification, may be configured to support a SU system, in which a STA may transmit frames to a single STA at a time. Such Specifications may not be able, for example, to support a STA transmitting to multiple STAs simultaneously, for example, using a MU-MIMO scheme, e.g., a DL MU-MIMO, or any other MU scheme.

In some demonstrative embodiments, devices 102, 140 and/or 160 may be configured to communicate over a channel bandwidth, e.g., of at least 2.16 GHz, in a frequency band above 45 GHz.

In some demonstrative embodiments, devices 102, 140 and/or 160 may be configured to implement one or more mechanisms, which may, for example, enable to extend a single-channel BW scheme, e.g., a scheme in accordance with the IEEE 802.11ad Specification or any other scheme, for higher data rates and/or increased capabilities, e.g., as described below.

In one example, the single-channel BW scheme may include communication over a 2.16 GHz channel (also referred to as a "single-channel" or a "DMG channel").

In some demonstrative embodiments, devices 102, 140 and/or 160 may be configured to implement one or more channel bonding mechanisms, which may, for example, support communication over a channel BW (also referred to as a "wide channel", an "EDMG channel", or a "bonded channel") including two or more channels, e.g., two or more 2.16 GHz channels, e.g., as described below.

In some demonstrative embodiments, the channel bonding mechanisms may include, for example, a mechanism and/or an operation whereby two or more channels, e.g., 2.16 GHz channels, can be combined, e.g., for a higher bandwidth of packet transmission, for example, to enable achieving higher data rates, e.g., when compared to transmissions over a single channel. Some demonstrative embodiments are described herein with respect to communication over a channel BW including two or more 2.16 GHz channels, however other embodiments may be implemented with respect to communications over a channel bandwidth, e.g., a "wide" channel, including or formed by any other number of two or more channels, for example, an aggregated channel including an aggregation of two or more channels.

In some demonstrative embodiments, device 102, device 140 and/or device 160 may be configured to implement one or more channel bonding mechanisms, which may, for example, support an increased channel bandwidth, for example, a channel BW of 4.32 GHz, a channel BW of 6.48 GHz, a channel BW of 8.64 GHz, and/or any other additional or alternative channel BW, e.g., as described below.

In some demonstrative embodiments, device 102, device 140 and/or device 160 may be configured to implement one or more channel bonding mechanisms, which may, for example, support an increased channel bandwidth, for example, a channel BW of 4.32 GHz, e.g., including two 2.16 Ghz channels according to a channel bonding factor of two, a channel BW of 6.48 GHz, e.g., including three 2.16 Ghz channels according to a channel bonding factor of three, a channel BW of 8.64 GHz, e.g., including four 2.16 Ghz channels according to a channel bonding factor of four, and/or any other additional or alternative channel BW, e.g., including any other number of 2.16 Ghz channels and/or according to any other channel bonding factor.

In some demonstrative embodiments, device 102, device 140 and/or device 160 may be configured to communicate one or more transmissions over one or more channel BWs, for example, including a channel BW of 2.16 GHz, a channel BW of 4.32 GHz, a channel BW of 6.48 GHz, a channel BW of 8.64 GHz and/or any other channel BW.

In some demonstrative embodiments, introduction of MIMO may be based, for example, on implementing robust transmission modes and/or enhancing the reliability of data transmission, e.g., rather than the transmission rate, compared to a Single Input Single Output (SISO) case. For example, one or more Space Time Block Coding (STBC) schemes utilizing a space-time channel diversity property may be implemented to achieve one or more enhancements for the MIMO transmission.

In some demonstrative embodiments, devices 102, 140 and/or 160 may be configured to generate, process, transmit and/or receive a Physical Layer (PHY) Protocol Data Unit (PPDU) having a PPDU format (also referred to as "EDMG PPDU format"), which may be configured, for example, for communication between EDMG stations, e.g., as described below.

In some demonstrative embodiments, a PPDU, e.g., an EDMG PPDU, may include at least one non-EDMG fields, e.g., a legacy field, which may be identified, decodable, and/or processed by one or more devices ("non-EDMG devices", or "legacy devices"), which may not support one or more features and/or mechanisms ("non-legacy" mechanisms or "EDMG mechanisms"). For example, the legacy devices may include non-EDMG stations, which may be, for example, configured according to an IEEE 802.11-2016 Standard, and the like. For example, a non-EDMG station may include a DMG station, which is not an EDMG station.

Figure 2:
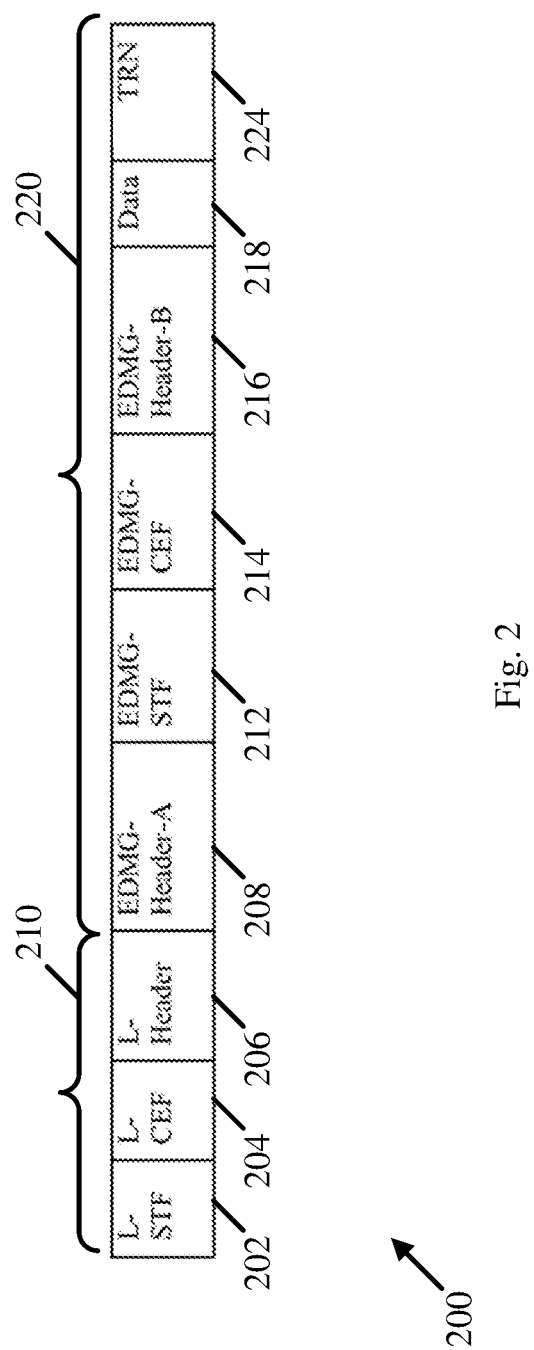
FIG. 2 is a schematic illustration of an Enhanced Directional Multi-Gigabit (EDMG) Physical Layer Protocol Data Unit (PPDU) format, which may be implemented in accordance with some demonstrative embodiments.

Reference is made to FIG. 2, which schematically illustrates an EDMG PPDU format 200, which may be implemented in accordance with some demonstrative embodiments. In one example, device 102 (FIG. 1), device 140 (FIG. 1), and/or device 160 (FIG. 1) may be configured to generate, transmit, receive and/or process one or more EDMG PPDUs having the structure and/or format of EDMG PPDU 200.

In one example, device 102 (FIG. 1), device 140 (FIG. 1), and/or device 160 (FIG. 1) may communicate PPDU 200, for example, as part of a transmission over a channel, e.g., an EDMG channel, having a channel bandwidth including one or more 2.16 GHz channels, for example, including a channel BW of 2.16 GHz, a channel BW of 4.32 GHz, a channel BW of 6.48 GHz, a channel BW of 8.64 GHz, and/or any other channel BW, e.g., as described below.

In some demonstrative embodiments, as shown in FIG. 2, EDMG PPDU 200 may include a non-EDMG portion 210 ("legacy portion"), e.g., as described below.

In some demonstrative embodiments, as shown in FIG. 2, non-EDMG portion 210 may include a non-EDMG (legacy) Short Training Field (STF) (L-STF) 202, a non-EDMG (Legacy) Channel Estimation Field (CEF) (L-CEF) 204, and/or a non-EDMG header (L-header) 206.

In some demonstrative embodiments, as shown in FIG. 2, EDMG PPDU 200, may include an EDMG portion 220, for example, following non-EDMG portion 210, e.g., as described below.

In some demonstrative embodiments, as shown in FIG. 2, EDMG portion 220 may include a first EDMG header, e.g., an EDMG-Header-A 208, an EDMG-STF 212, an EDMG-CEF 214, a second EDMG header, e.g., an EDMG-Header-B 216, a Data field 218, and/or one or more beamforming training fields, e.g., a TRN field 224.

In some demonstrative embodiments, EDMG portion 220 may include some or all of the fields shown in FIG. 2 and/or one or more other additional or alternative fields.

In some demonstrative embodiments, EDMG-Header-B field 216 may be included, for example, in EDMG MU PPDUs, for example, on a per STA basis.

In some demonstrative embodiments, EDMG-Header-B field 216 corresponding to a STA addressed by the EDMG MU PPDU may include, for example, information relating to a transmission of a data unit, for example, a PHY Service Data Unit (PSDU) to the STA.

In some demonstrative embodiments, EDMG Header B field 216 may include for example, 64 bits. In other embodiments, the EDMG Header B field 216 may include any other number of bits.

In one example, EDMG Header B field 216 corresponding to the STA may include, for example, at least a scrambler seed field, a PSDU length field, e.g., to indicate a length of the PSDU to the STA, and/or one or more Modulation and Coding Scheme (MCS) fields to indicate one or more MCSs. For example, the Header B field may include first and second MCS fields to indicate MCSs for first and second respective spatial streams.

In other embodiments, EDMG Header B field 216 may include any other additional or alternative fields and/or information.

Referring back to FIG. 1, in some demonstrative embodiments, devices 102, 140 and/or 160 may be configured to generate, transmit, receive and/or process one or more transmissions, e.g., including one or more EDMG PPDUs, e.g., as described below.

In some demonstrative embodiments, devices 102, 140 and/or 160 may be configured to support DL MU-MIMO transmissions, for example, as an enhancement, which may be implemented, for example, in accordance with an IEEE 802.11ay Specification, e.g., compared to an IEEE 802.11ad Specification, e.g., as described below.

In some demonstrative embodiments, a power saving mechanism, which may be configured for SISO transmissions, e.g., in compliance with an IEEE 802.11ad Specification, may be limited and/or may not be suitable, for example, for one or more scenarios, deployments and/or use cases, e.g., of DL MU-MIMO transmissions. In some demonstrative embodiments, devices 102, 140 and/or 160 may be configured to communicate DL MU-MIMO transmissions according to a procedure, which may be configured to support a power save mechanism, which may be suitable, for example, for one or more scenarios of DL MU-MIMO transmissions, e.g., as described below.

In some demonstrative embodiments, communication according to a MU PPDU acknowledgement procedure, e.g., in compliance with an IEEE 802.11ac Specification, may be limited and/or may not be suitable, for example, for one or more scenarios, deployments and/or use cases, for example, of DL MU-MIMO transmissions, e.g., as described below.

Figure 3:
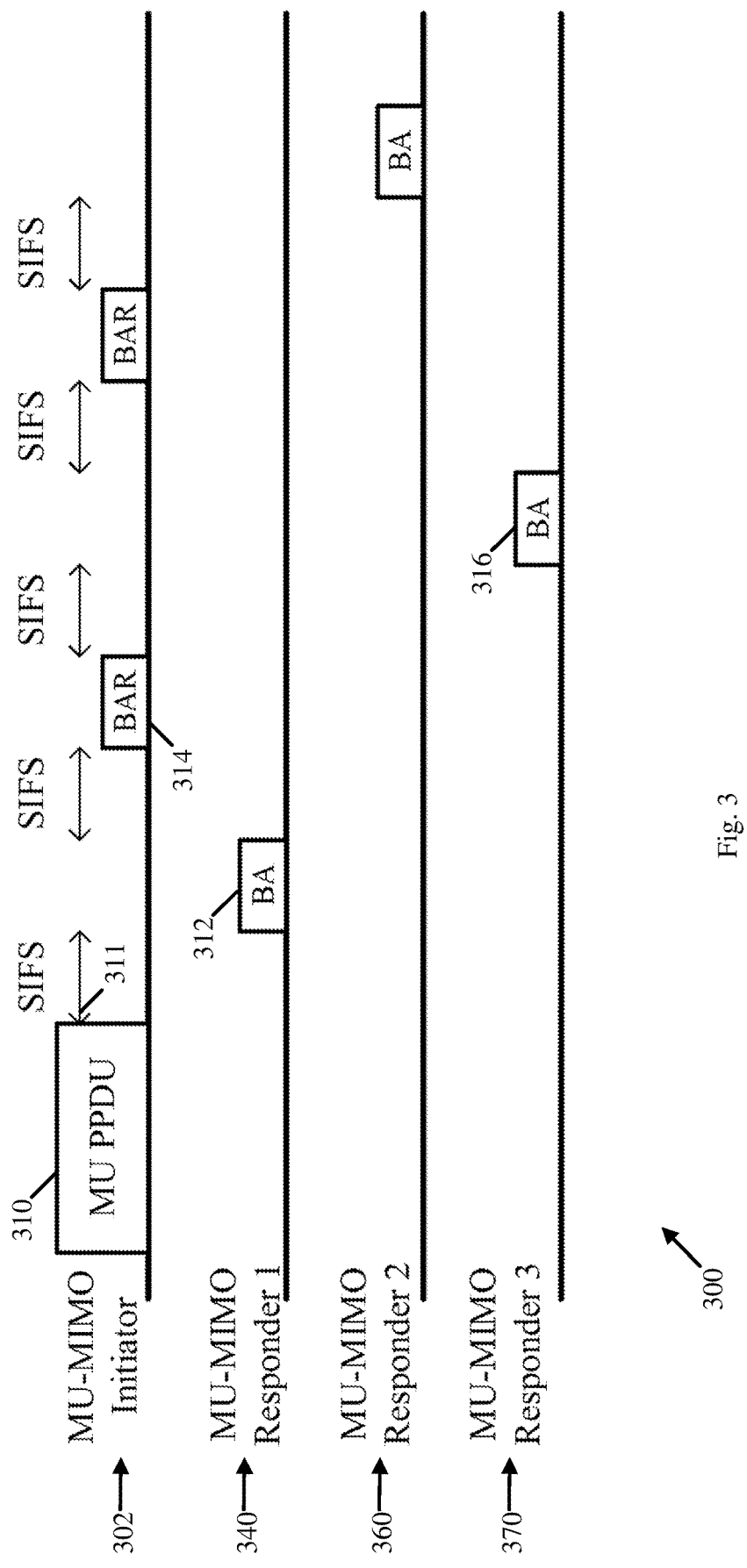
FIG. 3 is a schematic illustration of a Multi-User (MU) PPDU acknowledgement procedure to demonstrate one or more technical aspects, which may be addressed in accordance with some demonstrative embodiments.

Reference is made to FIG. 3, which schematically illustrates an MU PPDU acknowledgement procedure 300 to demonstrate one or more technical aspects, which may be addressed in accordance with some demonstrative embodiments.

In one example, one or more of the operations of the MU PPDU acknowledgement procedure 300 may be in compliance with an IEEE 802.11ac Specification.

For example, as shown in FIG. 3, MU PPDU acknowledgement procedure 300 may be performed between a MU-MIMO initiator STA 302 and a plurality of MU-MIMO responders including a first responder STA 340, a second responder STA 360, and a third responder STA 370.

For example, as shown in FIG. 3, the initiator STA 302 may create a MU PPDU 310. For example, a MAC of the initiator 302 may form a plurality of Aggregate MAC Protocol Data Units (A-MPDUs), e.g., for each of the recipient STAs.

In one example, a duration of the MU PPDU 310 may be determined by the longest encoded A-MPDU.

In one example, the A-MPDUs for each STA may be padded, for example, such that each A-MPDU occupies the same number of symbols.

In one example, as shown in FIG. 3, the MU PPDU acknowledgement procedure 300 may be configured such that at most one STA is set to an "Implicit Block Ack Request" mode, and sends a BA immediately after a Short Interframe Space (SIFS) time of the end of MU-PPDU.

For example, as shown in FIG. 3, MU PPDU acknowledgement process 300 may be configured such that the Ack Policy of a first responder is set to the "Implicit Block Ack Request" mode.

For example, as shown in FIG. 3, responder STA 340 may be set to the "Implicit Block Ack Request" mode, and may send a BA 312, for example, immediately after a SIFS 311 from the end of MU-PPDU 310, In one example, as shown in FIG. 3, all the other STAs, e.g., except from the first responder, may be set to a "Block Ack" mode, and may wait for a BA solicitation, e.g., reception of a BAR, before responding with a BA.

For example, as shown in FIG. 3, responder STA 370 may be set to the "Block Ack" mode, and may send a BA 316, for example, only after reception of a BAR 314 from initiator STA 302, which solicits the BA 316.

In some demonstrative embodiments, MU PPDU acknowledgement process 300 may not be suitable, may not be efficient, and/or may suffer one or more technical problems, for example, in some use cases, scenarios and/or implementations.

In some demonstrative embodiments, implementing the MU PPDU acknowledgement process 300 may result, for example, in a situation wherein except for the STA marked with implicit BAR, e.g., STA 340, all other STAs, e.g., STAs 360 and 370, may not know when they will receive a BAR from the initiator 302, e.g., PCP/AP, and therefore have to power on and wait continuously until they hear a BAR from the PCP/AP.

Referring back to FIG. 1, in some demonstrative embodiments, devices 102, 140 and/or 160 may be configured to perform one or more operations and/or flows, which may be configured to support a MU-MIMO setup, channel access, and/or Transmit Opportunity (TXOP) establishment, for example, for a MU-MIMO transmission, e.g., as described below.

In some demonstrative embodiments, devices 102, 140 and/or 160 may be configured to perform one or more operations of a MU PPDU Acknowledgement mechanism, for example, to acknowledge a MU-MIMO transmission, for example, a DL MU-MIMO transmission, e.g., from device 102 to devices 140 and/or 160, e.g., as described below.

In some demonstrative embodiments, devices 102, 140 and/or 160 may be configured to perform one or more operations of a power save mechanism, for example, for the DL MU-MIMO transmission, e.g., to provide improved power save performance of EDMG STAs, e.g., as described below.

In some demonstrative embodiments, the MU PPDU Acknowledgement mechanism may include supporting techniques and/or protocols, which may be configured, for example, to support and/or guarantee execution of the power save mechanism, e.g., as described below.

In some demonstrative embodiments, device 102 may be configured to perform one or more operations of an EDMG MU-MIMO initiator STA, for example, to transmit a MU-MIMO transmission, e.g., an EDMG MU-MIMO transmission, to a plurality of MU-MIMO responder STAs, for example, in a MU group, e.g., devices 140 and/or 160.

In some demonstrative embodiments, device 102 may be configured to transmit an EDMG MU PPDU, e.g., according to the format of EDMG PPDU 200 (FIG. 2), to a plurality of EDMG stations, e.g., including devices 140 and/or 160, e.g., as described below.

In some demonstrative embodiments, controller 124 may be configured to control, cause and/or trigger the STA implemented by device 102 to transmit an EDMG MU PPDU to a plurality of EDMG STAs, for example, including devices 140 and/or 160, e.g., as described below.

In some demonstrative embodiments, controller 124 may be configured to control, cause and/or trigger the STA implemented by device 102 to transmit the EDMG MU PPDU over a channel bandwidth of at least 2.16 Gigahertz (GHz), e.g., as described below.

In some demonstrative embodiments, controller 124 may be configured to control, cause and/or trigger the STA implemented by device 102 to transmit the EDMG MU PPDU over a channel bandwidth in a frequency band above 45 GHz, e.g., as described below.

In some demonstrative embodiments, controller 124 may be configured to control, cause and/or trigger the STA implemented by device 102 to configure an ordered plurality of Block Acknowledgement (BA) periods for the plurality of EDMG STAs according to an ordered acknowledgement scheme, e.g., as described below.

In some demonstrative embodiments, the ordered acknowledgement scheme may define an order at which the plurality of EDMG STAs are to transmit a respective plurality of BAs to device 102, e.g., as described below.

In some demonstrative embodiments, controller 124 may be configured to control, cause and/or trigger the STA implemented by device 102 to configure the ordered plurality of BA periods, for example, according to an order of the plurality of EDMG STAs indicated in a group description of a MU group including the plurality of EDMG STAs, e.g., as described below.

In other embodiments, the ordered plurality of BA periods may be configured according to any other order, parameter and/or criterion.

In some demonstrative embodiments, controller 124 may be configured to control, cause and/or trigger the STA implemented by device 102 to transmit to the plurality of EDMG STAs an indication of the ordered plurality of BA periods, e.g., as described below.

In some demonstrative embodiments, controller 124 may be configured to control, cause and/or trigger the STA implemented by device 102 to receive one or more BAs of the plurality of BAs from one or more respective EDMG STAs of the plurality of EDMG STAs, e.g., as described below.

In some demonstrative embodiments, controller 124 may be configured to control, cause and/or trigger the STA implemented by device 102 to receive one or more BAs of the plurality of BAs over the channel bandwidth in the frequency band above 45 GHz, e.g., as described below.

In some demonstrative embodiments, controller 124 may be configured to control, cause and/or trigger the STA implemented by device 102 to receive one or more BAs of the plurality of over the channel bandwidth of at least 2.16 GHz, e.g., as described below.

In some demonstrative embodiments, the plurality of EDMG STAs may receive the EDMG MU PPDU from device 102, e.g., as described below.

In some demonstrative embodiments, an EDMG STA, e.g., each EDMG STA, of the plurality of EDMG STAs, e.g., device 140, may receive an A-MPDU for the EDMG STA in the EDMG MU PPDU from device 102, e.g., as described below.

In some demonstrative embodiments, controller 154 may be configured to control, cause and/or trigger the STA implemented by device 140 to receive an A-MPDU for device 140 in the EDMG MU PPDU from device 102, e.g., as described below.

In some demonstrative embodiments, controller 154 may be configured to control, cause and/or trigger the STA implemented by device 140 to receive the A-MPDU over the channel bandwidth of at least 2.16 GHz, e.g., as described below.

In some demonstrative embodiments, controller 154 may be configured to control, cause and/or trigger the STA implemented by device 140 to receive the A-MPDU over the channel bandwidth in the frequency band above 45 GHz, e.g., as described below.

In some demonstrative embodiments, controller 154 may be configured to control, cause and/or trigger the STA implemented by device 140 to determine, according to the ordered acknowledgement scheme, a BA period in which device 140 is to be awake, for example, to allow transmission of a BA from device 140 to device 102, e.g., as described below.

In some demonstrative embodiments, controller 154 may be configured to control, cause and/or trigger the STA implemented by device 140 to determine the BA period, for example, according to the BA order indicated by device 102, e.g., as described below.

In some demonstrative embodiments, controller 154 may be configured to control, cause and/or trigger the STA implemented by device 140 to determine a beginning of the BA period, for example, based on the order of EDMG STAs indicated in the group description from device 102, of the MU group including device 140, for example, the MU group including devices 140 and/or 160, e.g., as described below.

In some demonstrative embodiments, controller 154 may be configured to control, cause and/or trigger the STA implemented by device 140 to determine the beginning of the BA period based on a predefined Modulation and Coding Scheme (MCS) value allowed for transmission of the BA, e.g., as described below.

In some demonstrative embodiments, device 140 may be allowed to be in a power save mode, for example, during a first power save period, which is based on an A-MPDU for device 140, for example, a time period which begins with respect to a time of the A-MPDU for device 140, e.g., as described below.

In some demonstrative embodiments, controller 154 may be configured to allow the STA implemented by device 140 to be in a power save mode during a first power save period from a time of an End of Frame (EOF) field in the A-MPDU for device 140.

In some demonstrative embodiments, the first power save period may continue until, for example, a beginning of the BA period, e.g., as described below.

In one example, device 140 may be allowed to be in the power save mode, for example, from a time of detection of the EOF field in the A-MPDU for device 140.

In some demonstrative embodiments, controller 154 may be configured to control, cause and/or trigger the STA implemented by device 140 to transmit the BA to device 102, e.g., as described below.

In some demonstrative embodiments, controller 154 may be configured to control, cause and/or trigger the STA implemented by device 140 to transmit the BA over the channel bandwidth in the frequency band above 45 GHz, e.g., as described below.

In some demonstrative embodiments, controller 154 may be configured to control, cause and/or trigger the STA implemented by device 140 to transmit the BA over the channel bandwidth of at least 2.16 GHz, e.g., as described below.

In some demonstrative embodiments, controller 154 may be configured to allow the STA implemented by device 140 to be in the power save mode during a second power save period after transmission of the BA, e.g., as described below.

In some demonstrative embodiments, the second power save period may begin, for example, immediately after transmission of the BA and may continue, for example, until an end of an acknowledgement period, e.g., as described below.

In some demonstrative embodiments, the acknowledgement period may include a plurality of BA periods ordered according to the ordered acknowledgement scheme, e.g., as described below.

In some demonstrative embodiments, controller 154 may be configured to control, cause and/or trigger the STA implemented by device 140 to be in an awake mode, for example, to be able to receive the BAR from device 102, for example, after the end of the acknowledgement period, e.g., as described below.

In some demonstrative embodiments, the second power save period may begin, for example, a BA confirmation time after transmission of the BA and may continue, for example, until an end of the acknowledgement period including the plurality of BA periods ordered according to the ordered acknowledgement scheme, e.g., as described below.

In other embodiments, the first power save period and/or the second power save period may be defined, configured and/or scheduled to begin and/or end according to any other scheme and/or criterion.

In some demonstrative embodiments, device 102 may successfully receive the BA from device 140, for example, during the BA period for the device 140.

In some demonstrative embodiments, device 102 may not receive a BA from an EDMG STA, e.g., a BA from device 104 and/or a BA from device 160, e.g., as described below.

In some demonstrative embodiments, controller 124 may be configured to control, cause and/or trigger the STA implemented by device 102 to transmit a BAR to an EDMG STA during a BA period for the EDMG STA, and to receive a BA from the EDMG STA in response to the BAR e.g., as described below.

In some demonstrative embodiments, device 102 may transmit the BAR to an EDMG STA, from which a BA is not received, e.g., as described below.

In some demonstrative embodiments, an EDMG STA, e.g., device 140 may receive a BAR from the EDMG MU-MIMO initiator STA, e.g., device 102, for example, if the EDMG MU-MIMO initiator STA is not able to successfully receive the BA from the EDMG STA.

In some demonstrative embodiments, controller 154 may be configured to control, cause and/or trigger the STA implemented by device 140 to receive a BAR from device 102 during the BA period, and to transmit a BA in response to the BAR from device 102, e.g., as described below.

In some demonstrative embodiments, device 102 may transmit the BAR to an EDMG STA, from which a BA is not received, for example, in a BA period for the EDMG STA, e.g., as described below.

In some demonstrative embodiments, controller 124 may be configured to control, cause and/or trigger the STA implemented by device 102 to transmit the BAR to an EDMG STA, e.g., device 140, from which a BA is not received, e.g., as described below.

In some demonstrative embodiments, the BAR may be transmitted, for example, after an acknowledgement period including the ordered plurality of BA periods, e.g., as described below.

In some demonstrative embodiments, the BAR may be transmitted, for example, immediately after the BA period for the EDMG STA, e.g., as described below.

In some demonstrative embodiments, devices 102, 140 and/or 160 may be configured to communicate the MU-MIMO transmission according to a MU-MIMO power save mechanism, e.g., as described below.

In some demonstrative embodiments, for example, after receiving the EDMG MU PPDU transmitted from a MU-MIMO initiator, e.g., device 102, responder STAs that are involved in the MU-MIMO transmission may be allowed to go to, e.g., to switch to and/or to operate at, a power save mode.

For example, a responder STA, e.g., device 140, may be allowed to switch to, and/or operate at, a power save mode if it is not its individual turn to acknowledge the MU PPDU, for example, using a BA, for example, by performing a BAR/BA frame exchange with the MU-MIMO initiator, e.g., as described below.

In some demonstrative embodiments, devices 102, 140 and/or 160 may be configured to communicate the BAR/BA frames according to an ordered BA communication sequence, for example, including a BAR/BA exchange sequence, e.g., as described below.

Some demonstrative embodiments are described below with respect to an BA communication scheme including a sequence of BA periods, which may include, for example, a BAR/BA exchange. However, in other embodiments, a responder STA may communicate a BA in a BA period, for example, in an implicit manner, for example, even if a BAR is not used to solicit the BA.

In some demonstrative embodiments, responder STAs in the MU group shall perform the EDMG MU PPDU acknowledgement procedure in an ordered manner, for example, in an agreed and/or preconfigured order, e.g., as described below.

In some demonstrative embodiments, for example, the order of the EDMG MU PPDU acknowledgement may be the same as an order of Association Identifiers (AIDs), e.g., as appearing in a group description corresponding to this MU group present in the EDMG Group ID Set element.

In other embodiments, the order of the EDMG MU PPDU acknowledgement may be determined, signaled, negotiated, and/or configured according to any other scheme and/or criteria.

In some demonstrative embodiments, devices 102, 140 and/or 160 may be configured to communicate the BAR/BA frames according to an immediate BAR retransmission scheme, for example, with respect to a missing BA, e.g., as described below.

In some demonstrative embodiments, for example, if an initiator STA does not receive a BA from a responder STA and decides to retransmit the BAR, the initiator STA may retransmit the BAR a predefined period, for example, a SIFS time, or any other time, for example, immediately after the expected but missing BA, e.g., as described below with reference to FIG. 4.

In some demonstrative embodiments, devices 102, 140 and/or 160 may be configured to communicate the BAR and the BA frames according to a delayed BAR retransmission scheme, for example, with respect to a missing BA, e.g., as described below.

In some demonstrative embodiments, for example, if the initiator STA does not receive the BA from a responder STA and decides to retransmit the BAR, the initiator may retransmit the BAR, for example, at the end of current MU PPDU and BA/BAR exchanges, e.g., as described below with reference to FIG. 5.

In some demonstrative embodiments, devices 102, 140 and/or 160 may be configured to implement a power save mechanism, which may allow, for example, feasible power save duration calculation, e.g., as described below.

In some demonstrative embodiments, for example, a responder STA may be configured to calculate its power save duration, for example, in a manner which may allow ensuring that the responder STA may be able to calculate its power save duration correctly, for example, such that the responder STA will not miss its corresponding BAR/BA exchange with the initiator STA.

In some demonstrative embodiments, for example, a responder STA, e.g., each STA, shall estimate its feasible power save periods assuming all other responder STAs and the initiator STA use the highest MCS value allowed to transmit the BAR/BA, and assuming all BAR/BA are of the smallest possible sizes, e.g., as described below.

In other embodiments, any other additional and/or alternative parameters and/or criteria may be implemented to determine the power save period for a responder STA.

In some demonstrative embodiments, the operations and/or mechanisms described herein may be implemented to provide MU-MIMO power save benefits, which may be significant, for example, at least in scenarios with small EDMG MU-PPDU size, e.g., as described below.

In some demonstrative embodiments, a MU PPDU acknowledgement process may be configured according to an ordered BA/BAR exchange mechanism, e.g., as described below.

In some demonstrative embodiments, a BAR solicitation may be performed in an agreed order, for example, instead of performing the BAR solicitation in a random order. Accordingly, a STA, e.g., even each ST, may know its specific order of BAR/BA exchange, e.g., as described below.

In some demonstrative embodiments, the BAR/BA order of the MU group may be defined to be the same as the AIDs appear in the EDMG Group ID set element.

In other embodiments, the order of the BAR/BA exchanges may be defined, determined, negotiated, signaled and/or configured according to any other additional or alternative parameter and/or criterion.

In some demonstrative embodiments, the ordered BA/BAR exchange sequence may enable, for example, a responder STA, e.g., even each responder STA, to be able to know when it should wake up to receive the corresponding BAR frame addressed to it.

In some demonstrative embodiments, a BAR may be retransmitted by an initiator STA according to a BAR retransmission mechanism, for example, if the initiator STA has not successfully received a BA corresponding to the BAR (missed BA), e.g., as described below.

In some demonstrative embodiments, a BAR may be retransmitted according to an immediate BAR retransmission mechanism, e.g., as described below.

In some demonstrative embodiments, immediate BAR retransmission may be performed for a missing BA, e.g., as described below.

In some demonstrative embodiments, for example, if the initiator STA does not receive the BA from a responder STA and decides to retransmit the BAR, the initiator may retransmit the BAR a predefined period, e.g., a SIFS time or any other period, e.g., immediately after the expected but missing BA.

In some demonstrative embodiments, immediate BAR retransmission may enable the responder STA to know if its BA has been successfully received by the initiator or not.

In some demonstrative embodiments, for example, after transmitting the BA, STAs shall may for at least another SIFS+BAR time to determine if another BAR is received, e.g., as described below.

In some demonstrative embodiments, for example, if a responder STA receives, for example, another BAR from the initiator STA, it means its transmitted BA was lost, and the responder STA may retransmit the BA, e.g., as described below.

In some demonstrative embodiments, for example, if the responder STA does not receive another BAR, the responder STA may know that the transmitted BA was successfully received by the initiator, and then the responder STA may be allowed to go to a power save mode, e.g., "safely".

In some demonstrative embodiments, a BAR may be retransmitted according to a delayed BAR retransmission mechanism, e.g., as described below.

In some demonstrative embodiments, the delayed BAR retransmission may be performed for a missing BA, e.g., as described below.

In some demonstrative embodiments, for example, if the initiator STA does not receive the BA from a responder STA and decides to retransmit the BAR, the initiator STA may retransmit the BAR at an end of a current MU PPDU and BA/BAR exchanges, e.g., as described below.

In some demonstrative embodiments, all STAs may be expected to wake up at the end of the current MU PPDU and BAR/BA exchanges, for example, to be able to receive any retransmitted BAR intended for them, for example, if their previous transmitted BA was lost, e.g., as described below.

In some demonstrative embodiments, devices 102, 140, and/or 160 may be configured to perform one or more operations of a MU-MIMO power save mechanism, for example, during the procedure of the MU-MIMO PPDU transmission, e.g., as described below.

In some demonstrative embodiments, a responder STA marked with implicit BAR may be allowed to go to a Power Save (PS) mode, for example, during at least part of one time period, for example, from the time of confirming the successful receiving of the BA by the initiator, for example, to the end of the current MU PPDU transmission, e.g., as described below.

In some demonstrative embodiments, one or more STAs, which are not the responder STA marked with implicit BAR, for example, the other STAs, can be allowed to go to Power Save mode, for example, during one or more time periods, for example, two time periods, e.g., as described below.

In some demonstrative embodiments, one or more STAs, which are not the responder STA marked with implicit BAR, for example, the other STAs, may be allowed to go to the Power Save mode, for example, during a time period, which may begin from the time of detecting an EOF field in its individual A-MPDU, for example, without needing to wait for any padding data transmission, for example, to a time of wake up, for example, before its corresponding BA period, e.g., the BAR/BA exchange with the initiator STA, e.g., as described below.

In some demonstrative embodiments, for example, if using the immediate BAR retransmission mechanism, one or more STAs, which are not the responder STA marked with implicit BAR, for example, the other STAs, may be allowed to go to the Power Save mode, for example, during a time period, which may begin from the time of confirming the successful reception of BA by the initiator STA, for example, to the end of the current MU PPDU and BA periods, e.g., including the BA/BAR exchanges, e.g., as described below.

In some demonstrative embodiments, for example, if using the delayed BAR retransmission mechanism, one or more STAs, which are not the responder STA marked with implicit BAR, for example, the other STAs, may be allowed to go to Power Save mode, for example, during a time period, which may begin from the time of finishing transmission of the BA, for example, to the end of the current MU PPDU and BA/BAR exchanges, e.g., as described below.

In some demonstrative embodiments, a responder STA, e.g., devices 140 and/or 160, may be configured to determine and/or calculate one or more feasible power save periods for the responder STA, for example, to be allowed to be in the PS mode, e.g., as described below.

In some demonstrative embodiments, the responder STAs may be configured calculate their respective feasible power save periods. In one example, the calculation of the feasible power save periods may include, for example, calculation of the transmission time of the BA/BAR exchanges between other Initiator-Responder pairs, e.g., as described below.

In some demonstrative embodiments, for example, a STA may not be able to know the MCS values used by the other STAs for transmitting the BA.

In some demonstrative embodiments, for example, if a STA miscalculates its feasible PS periods, the STA may miss the corresponding BAR frame addressed to it.

In some demonstrative embodiments, for example, in order to ensure STAs will not miss their corresponding BAR/BA exchange with the initiator STA, a responder STA, e.g., even each STA, may estimate its feasible power save periods, for example, assuming that all other STAs and the initiator STA use the highest MCS value allowed to transmit the BAR/BA, and/or assuming that the BAR/BA frames are of the smallest possible sizes.

In other embodiments, feasible power save periods may be estimated according to any other additional or alternative assumption and/or criteria.

In some demonstrative embodiments, a transmission of a BA frame, for example, in compliance with an IEEE 802.11ay Specification, may comply with a rule that an EDMG STA transmitting a BA frame may use an MCS from a mandatory MCS set of the DMG SC modulation class, e.g., when the BA frame is sent within an EDMG PPDU.

For example, a transmission of a BAR frame, for example, in compliance with an IEEE 802.11ay Specification, may comply with a rule, which may be the same as the rule for a standalone BA frame.

For example, a highest mandatory Single Carrier MCS for DMG, for example, in compliance with an IEEE 802.11ad Specification, may be MCS 4.

Figure 4:
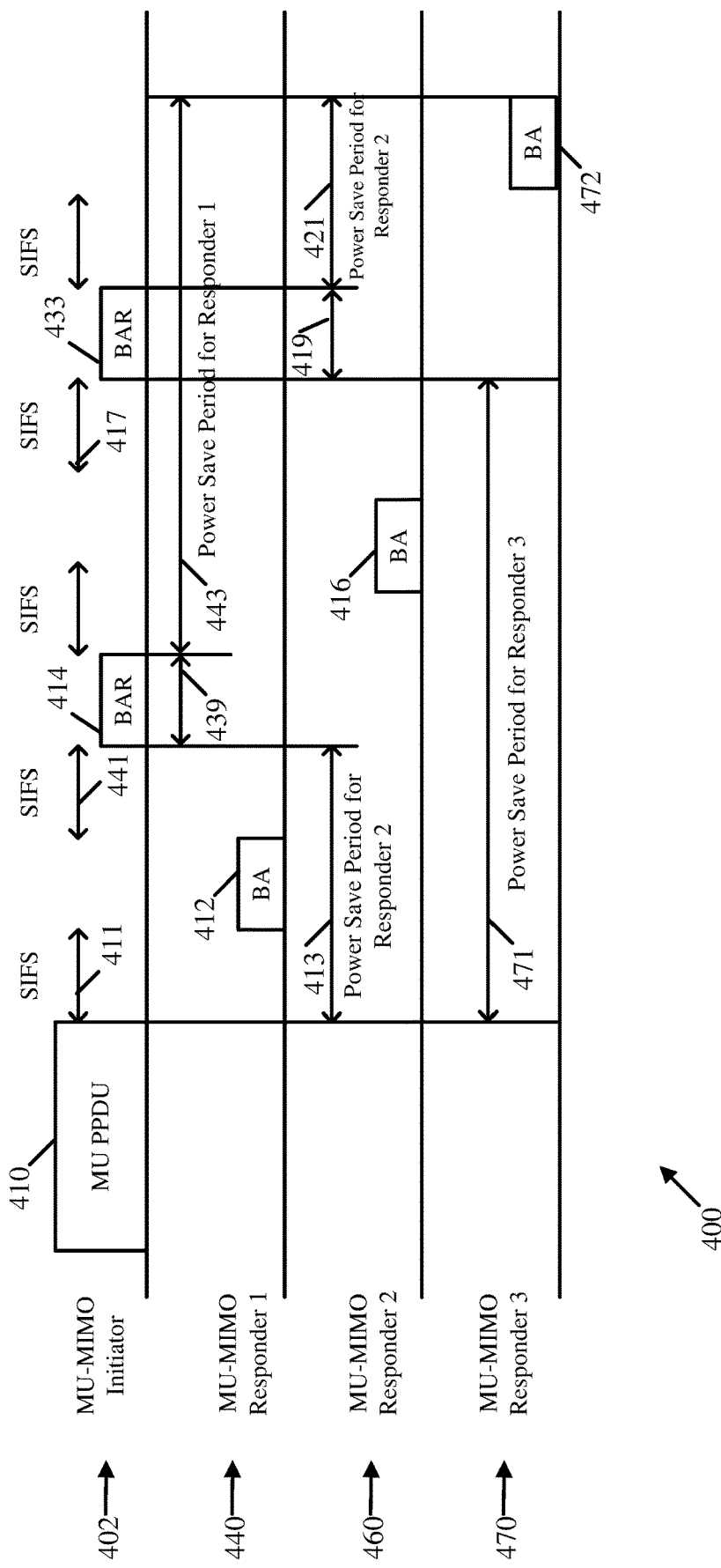
FIG. 4 is a schematic illustration of communications and operations according to a MU PPDU acknowledgement mechanism, in accordance with some demonstrative embodiments.

Reference is made to FIG. 4, which schematically illustrates operations and communications according to a MU PPDU acknowledgement mechanism 400, in accordance with some demonstrative embodiments.

In some demonstrative embodiments, MU PPDU acknowledgement mechanism 400 may be configured to support immediate BAR retransmission, e.g., as described below.

For example, one or more of the operations and/or communications of FIG. 4 may be performed according to a MU-MIMO power save mechanism with immediate BAR retransmission, e.g., as described above.

In one example, as shown in FIG. 4, MU PPDU acknowledgement mechanism 400 may be performed between a MU-MIMO initiator STA 402 and a plurality of MU-MIMO responders including a first responder STA 440, a second responder STA 460, and/or a third responder STA 470. In other embodiments, any other number of responders may be implemented.

In some demonstrative embodiments, for example, MU-MIMO initiator STA 402 may perform a role of, one or more operations of, and/or one or more functionalities of, device 102 (FIG. 1); and/or responder STAs 440, 460, and/or 470 may perform a role of, one or more operations of, and/or one or more functionalities of device 140 (FIG. 1).

In some demonstrative embodiments, as shown in FIG. 4, the MU-MIMO initiator STA 402 may create a MU PPDU 410, e.g., according to the EDMG PPDU format 200 (FIG. 2). For example, a MAC of the MU-MIMO initiator STA 402 may form a plurality of A-MPDUs, e.g., for each of the responder STAs.

In some demonstrative embodiments, a responder STA, e.g., responder STA 440, responder STA 460 and/or responder STA 470, may determine a BA period, during which the responder STA is to be awake to allow transmission of a BA from the responder STA to the initiator STA 402.

In some demonstrative embodiments, responder STA 440 may determine a first BA period during which STA 440 is to be awake to transmit BA 412, STA 460 may determine a second BA period during which STA 460 is to be awake to transmit a BA 416, and/or STA 470 may determine a third BA period during which STA 470 is to be awake to transmit a BA 472, e.g., as described above.

In some demonstrative embodiments, initiator STA 402, responder STA 440, responder STA 460 and/or responder STA 470 may be configured to implement an immediate BAR retransmission scheme, e.g., as described below.

For example, according to the immediate BAR retransmission scheme, the MU-MIMO initiator STA 402 may be configured to transmit a BAR to a responder STA, for example, after a BA period for the responder STA, e.g., if a BA is not received from the responder STA during the BA period, e.g., as described below.

In some demonstrative embodiments, as shown in FIG. 4, the MU PPDU acknowledgement mechanism 400 may be configured such that responder STA 440 may be set to an "Implicit Block Ack Request" mode, and may send a BA 412, for example, a SIFS 411 immediately after the end of MU-PPDU 410.

In some demonstrative embodiments, a responder STA, e.g., responder STA 460 and/or responder STA 470, may be allowed to be in a first power save period, for example, from a time of an EOF field of an A-MPDU for the responder STA in MU-PPDU 410, for example, until a beginning of the BA period of the responder STA.

In some demonstrative embodiments, as shown in FIG. 4, STA 460 may be allowed be in a power save mode during a power save period 413.

For example, the responder STA 460 may be configured to determine the power save period 413 to begin at a time of detection of an EOF field in an A-MPDU for the responder STA 460 in the MU PPDU 410, e.g., as described above.

For example, the responder STA 460 may be configured to determine the power save period 413 to end before a beginning of the BA period for the responder STA 460.

In some demonstrative embodiments, as shown in FIG. 4, STA 470 may be allowed be in a power save mode during a power save period 471.

For example, the responder STA 470 may be configured to determine the power save period 471 to begin at a time of detection of an EOF field in an A-MPDU for the responder STA 470 in the MU PPDU 410, e.g., as described above.

For example, the responder STA 460 may be configured to determine the power save period 471 to end before a beginning of the BA period for the responder STA 470.

In some demonstrative embodiments, the MU-MIMO initiator STA 402 may be configured to retransmit a BAR to a responder STA, for example, immediately after the BA period for the responder STA, for example, if a BA from the responder STA is not received, e.g., according to the immediate BAR retransmission scheme.

In some demonstrative embodiments, a responder STA may be allowed to be in the power save mode during a second power save period, for example, after the transmission of the BA.

In some demonstrative embodiments, a responder STA may be allowed to be in the power save mode during a second power save period, for example, when the responder STA may determine that the BA from the responder STA is successfully received by the MU-MIMO initiator STA 402.

In some demonstrative embodiments, a responder STA, e.g., each responder STA, may stay awake, for example, for a SIFS and a BAR period, for example, after the transmission of the BA from the responder STA, for example, to allow the responder STA to receive a possible BAR from MU-MIMO initiator STA 402, for example, a retransmission of a BAR, e.g., when MU-MIMO initiator STA 402 did not receive the BA from the responder STA.

For example, the responder STA may be allowed to switch to the power save mode, for example, if during the SIFS and the BAR period following the BA transmission, the responder STA did not receive a BAR, which is intended for the responder STA, from the MU-MIMO initiator STA 402, or if the responder STA detects a BAR from the MU-MIMO initiator STA 402 that is intended for another responder STA.

In some demonstrative embodiments, as shown in FIG. 4, responder STA 440 may be allowed to in the power save mode during a power save period 443, which may begin, for example, a SIFS 441 and a BAR period 439 after transmission of BA 412. For example, the responder STA 440 may stay awake during SIFS 441 and BAR period 439 to allow the responder STA 440 to make sure that BA 412 is received by STA 402, for example, by allowing the responder STA 440 to detect BAR 414 and determine that BAR 414 is not intended for responder STA 440.

In some demonstrative embodiments, as shown in FIG. 4, responder STA 460 may be allowed to in the power save mode during a power save period 421, which may begin, for example, a SIFS 417 and a BAR period 419 after transmission of BA 416. For example, the responder STA 460 may stay awake during SIFS 417 and BAR period 419 to allow the responder STA 460 to make sure that BA 416 is received by STA 402, for example, by allowing the responder STA 460 to detect a BAR 433 and determine that BAR 433 is not intended for responder STA 460. In some demonstrative embodiments, STA 460 may be allowed to switch to the power save mode during the second power save period 421, for example, since STA 460 may assume that BA 416 is successfully received by STA 402, e.g., when no additional BAR to STA 460 is sent from STA 402 to STA 460.

Figure 5:
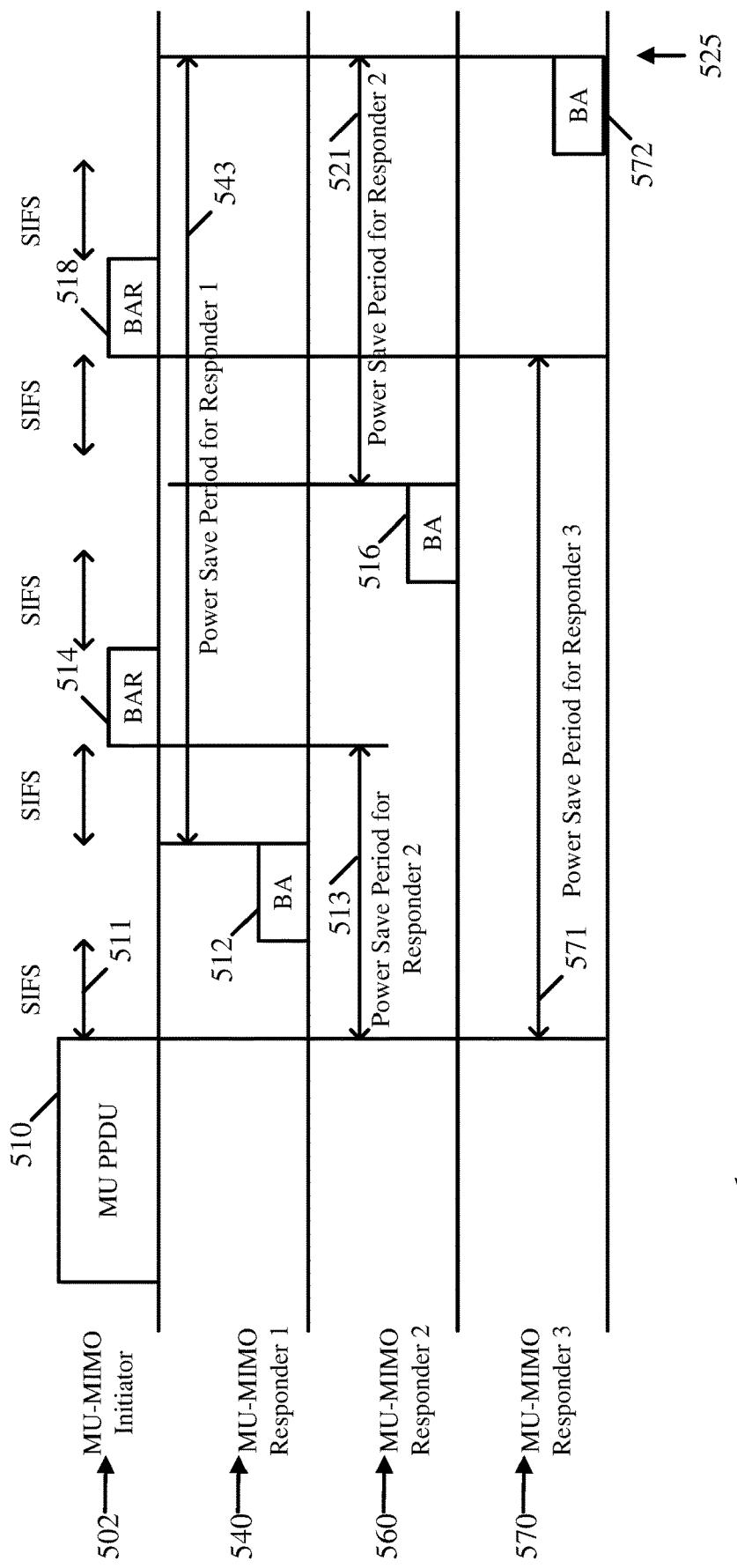
FIG. 5 is a schematic illustration of communications and operations according to a MU PPDU acknowledgement mechanism, in accordance with some demonstrative embodiments.

Reference is made to FIG. 5, which schematically illustrates operations and communications according to a MU PPDU acknowledgement mechanism 500, in accordance with some demonstrative embodiments.

In some demonstrative embodiments, MU PPDU acknowledgement mechanism 500 may be configured to support a delayed BAR retransmission, e.g., as described below.

In some demonstrative embodiments, for example, one or more of the operations and/or communications of FIG. 5 may be performed according to a MU-MIMO power save mechanism with delayed BAR retransmission, for example, at the end of the MU-MIMO procedure, e.g., as described above.

In one example, as shown in FIG. 5, MU PPDU acknowledgement mechanism 500 may be performed between a MU-MIMO initiator STA 502 and a plurality of MU-MIMO responders including a first responder STA 540, a second responder STA 560, and/or a third responder STA 570. In other embodiments, any other number of responders may be implemented.

In some demonstrative embodiments, for example, MU-MIMO initiator STA 502 may perform a role of, one or more operations of, and/or one or more functionalities of, device 102 (FIG. 1); and/or responder STAs 440, 460, and/or 470 may perform a role of, one or more operations of, and/or one or more functionalities of device 140 (FIG. 1).

In some demonstrative embodiments, as shown in FIG. 5, the MU-MIMO initiator STA 502 may create a MU PPDU 510, e.g., according to the EDMG PPDU format 200 (FIG. 2). For example, a MAC of the MU-MIMO initiator STA 502 may form a plurality of A-MPDUs, e.g., for each of the responder STAs.

In some demonstrative embodiments, a responder STA, e.g., responder STA 540, responder STA 560 and/or responder STA 570, may determine a BA period, during which the responder STA is to be awake to allow transmission of a BA from the responder STA to the initiator STA 502.

In some demonstrative embodiments, responder STA 540 may determine a first BA period during which STA 540 is to be awake to transmit BA 512, STA 560 may determine a second BA period during which STA 560 is to be awake to transmit a BA 516, and/or STA 570 may determine a third BA period during which STA 570 is to be awake to transmit a BA 572, e.g., as described above.

In some demonstrative embodiments, initiator STA 502, responder STA 540, responder STA 560 and/or responder STA 560 may be configured to implement a delayed BAR retransmission scheme, e.g., as described below.

For example, according to the delayed BAR retransmission scheme, the MU-MIMO initiator STA 502 may be configured to transmit a BAR to a responder STA, for example, after the BA periods for all responder STAs.

In some demonstrative embodiments, as shown in FIG. 5, the MU PPDU acknowledgement mechanism 500 may be configured such that STA 540 may be set to an "Implicit Block Ack Request" mode, and may send a BA 512, for example, a SIFS 511 immediately after of the end of MU-PPDU 510.

In some demonstrative embodiments, a responder STA, e.g., responder STA 560 and/or responder STA 570, may be allowed to be in a first power save period, for example, from a time of an EOF field of an A-MPDU for the responder STA in MU-PPDU 510, for example, until a beginning of the BA period of the responder STA.

In some demonstrative embodiments, as shown in FIG. 5, STA 560 may be allowed to be in a power save mode during a power save period 513.

For example, the responder STA 560 may be configured to determine the power save period 513 to begin at a time of detection of an EOF field in an A-MPDU for the responder STA 560 in the MU PPDU 510, e.g., as described above.

For example, the responder STA 560 may be configured to determine the power save period 513 to end before a beginning of the BA period for the responder STA 560.

In some demonstrative embodiments, as shown in FIG. 5, STA 570 may be allowed be in a power save mode during a power save period 571.

For example, the responder STA 570 may be configured to determine the power save period 571 to begin at a time of detection of an EOF field in an A-MPDU for the responder STA 570 in the MU PPDU 510, e.g., as described above.

For example, the responder STA 560 may be configured to determine the power save period 571 to end before a beginning of the BA period for the responder STA 570.

In some demonstrative embodiments, the MU-MIMO initiator STA 402 may be configured to transmit a BAR to a responder STA, for example, if a BA from the responder STA is not received.

In some demonstrative embodiments, STA 502 may be configured to retransmit to a responder STA a BAR after an end 525 of a BA period including, e.g., including the BAR/BR exchange, between STA 502 and the plurality of MU-MIMO responder STAs, for example, according to the delayed BAR retransmission.

In some demonstrative embodiments, a responder STA may be allowed to be in the power save mode during a second power save period, for example, after the transmission of the BA.

In some demonstrative embodiments, the responder STA may be allowed to determine the second power save period to begin, for example, immediately after transmission of a BA.

In some demonstrative embodiments, the responder STA may be allowed to determine the second power save period continue, for example, until the end time 525 of the sequence of BA periods, for example, after which the responder STA is to be awake to receive a possible BAR, e.g., if the MU-MIMO initiator STA 502 did not receive the BA from the responder STA.

In some demonstrative embodiments, as shown in FIG. 5, responder STA 540 may be awake during the BA period to transmit the BA 512, may be allowed to switch to the power save mode, e.g., immediately after transmission of the BA 512, and may remain in the power save mode during a power save period 543, for example, until the end time 525 of the BA sequence, for example, after which STA 540 may be awake to receive a possible BAR, e.g., a retransmission of a BAR, from the initiator STA 502.

In some demonstrative embodiments, as shown in FIG. 5, responder STA 560 may be in the power save mode during the first power save period 513.

In some demonstrative embodiments, as shown in FIG. 5, responder STA 560 may be awake, e.g., after power save period 513, to transmit BA 516 to STA 502, e.g., in response to a BAR 514 from STA 502.

In some demonstrative embodiments, as shown in FIG. 5, STA 560 may be allowed to switch to the power save mode, e.g., immediately after transmission of BA 516, e.g., since a retransmission of another BAR, e.g., when BA 516 is not received by STA 502, may be only after the end 525 of the BA sequence between STA 502 and the plurality of MU-MIMO responders.

In some demonstrative embodiments, as shown in FIG. 5, STA 560 may be allowed to remain in the power save mode during power save period 521, for example, until the end 525 of the BA sequence, for example, after which STA 560 may be awake to receive a possible BAR, e.g., a retransmission of the BAR, from the initiator STA 502.

In some demonstrative embodiments, as shown in FIG. 5, responder STA 570 may be allowed to be in the power save mode during the power save period 571.

In some demonstrative embodiments, as shown in FIG. 5, responder STA 570 may be awake, e.g., after power save period 571, to transmit BA 572 to STA 502, e.g., in response to a BAR 518 from STA 502.

In some demonstrative embodiments, responder STA 570 may be awake after end time 525 to receive a possible BAR, e.g., a retransmission of the BAR, from the initiator STA 502.

Following is a description of an analysis of power save benefits, which may be achieved, in accordance with some demonstrative embodiments. This example relates to a few demonstrative use cases. Other power save benefits may be achieved with respect to other use cases.

In some demonstrative embodiments, the power save mechanism described herein may provide, for example, technical benefits in terms of a percentage proportion of a feasible PS period of the overall duration of MU PPDU transmission and BAR/BA exchanges, e.g., as described below.

In other embodiments, other technical benefits may be achieved with respect to other additional or alternative parameters.

For example, in a first scenario ("scenario 1"), MCS 4 may be assumed for transmission of a BAR/BA.

For example, in a second scenario ("scenario 2"), MCS 0 may be assumed for transmission of a BAR/BA.

For example, in both scenarios, an MU group including eight STAs may be assumed, and the Ack Policy of all STAs may be set to "Block Ack". It may be assumed, for example, that the procedure goes well without BAR retransmissions.

In one example, the following power save benefits may be expected:

TABLE 1

| MU PPDU length (Kbytes) | Scenario 1: STA PS period percentage | Scenario 2: STA PS period percentage |
|---|---|---|
| 0.064 | 86.4% | 24.9% |
| 0.256 | 84.3% | 24.7% |
| 1.024 | 76.6% | 24.0% |
| 4.096 | 56.2% | 21.6% |
| 16.384 | 27.2% | 15.3% |
| 65.536 | 8.9% | 7.1% |

For example, according to these analysis results, it can be seen that the MU-MIMO power save scheme may provide significant benefits, for example, especially with respect to a small MU PPDU size.

Figure 6:
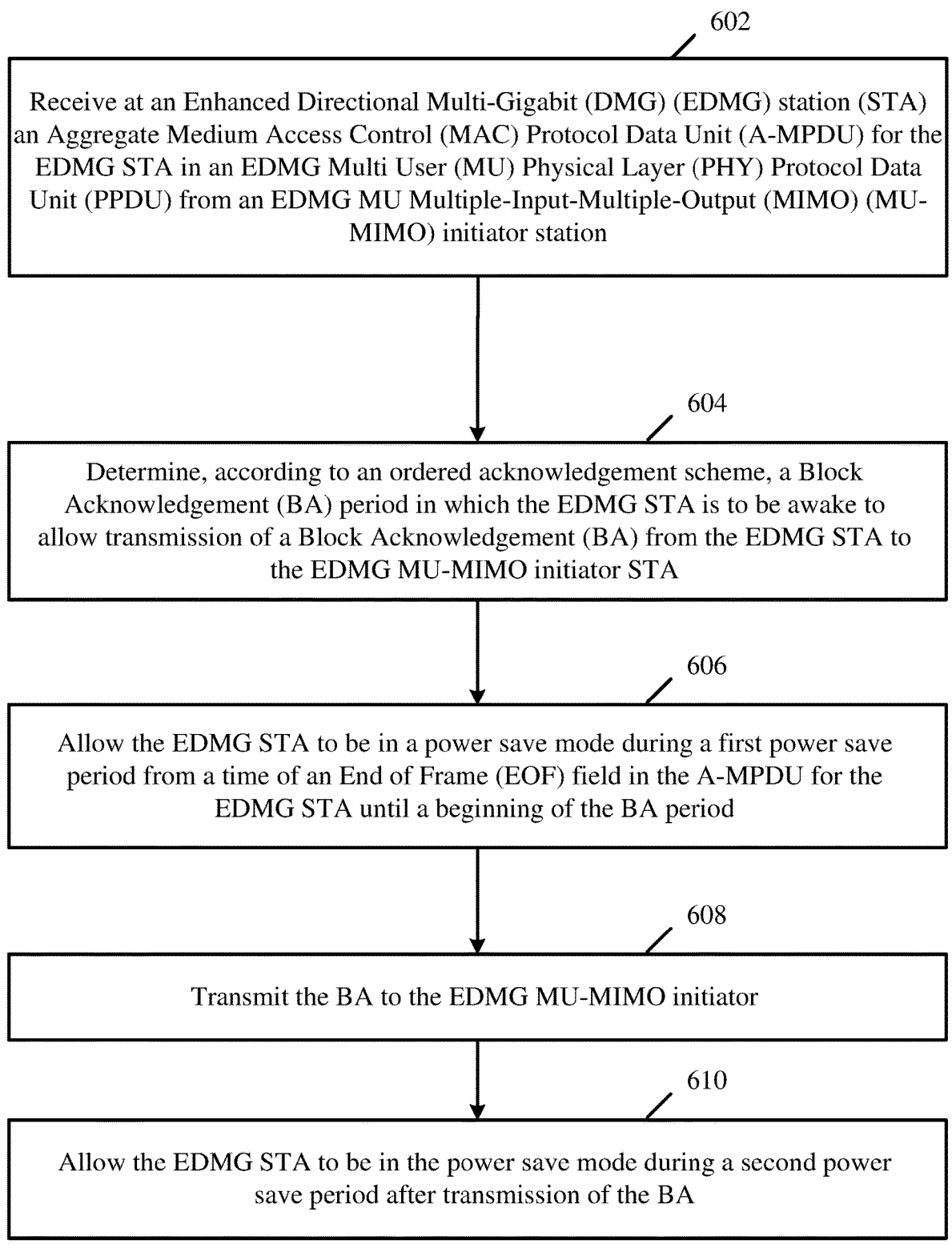
FIG. 6 is a schematic flow-chart illustration of a method of acknowledging a MU Multiple-Input-Multiple-Output (MIMO) (MU-MIMO) transmission, in accordance with some demonstrative embodiments.

Reference is made to FIG. 6, which schematically illustrates a method of acknowledging a MU-MIMO transmission, in accordance with some demonstrative embodiments. For example, one or more of the operations of the method of FIG. 6 may be performed by one or more elements of a system, e.g., system 100 (FIG. 1), for example, one or more wireless devices, e.g., device 102 (FIG. 1), device 140 (FIG. 1), and/or device 160 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 602, the method may include receiving at an EDMG STA an A-MPDU for the EDMG STA in an EDMG MU PPDU from an EDMG MU-MIMO initiator station. For example, controller 154 (FIG. 1) may be configured to cause, trigger, and/or control an EDMG STA implemented by device 140 (FIG. 1) to receive the A-MPDU for the EDMG STA in the EDMG MU PPDU from device 102 (FIG. 1), e.g., as described above.

As indicated at block 604, the method may include determining, according to an ordered acknowledgement scheme, a BA period in which the EDMG STA is to be awake to allow transmission of a BA from the EDMG STA to the EDMG MU-MIMO initiator STA. For example, controller 154 (FIG. 1) may be configured to cause, trigger, and/or control the EDMG STA implemented by device 140 (FIG. 1) to determine, according to the ordered acknowledgement scheme, the BA period in which device 140 (FIG. 1) is to be awake to allow the transmission of the BA from device 140 (FIG. 1) to device 102 (FIG. 1), e.g., as described above.

As indicated at block 606, the method may include allowing the EDMG STA to be in a power save mode during a first power save period from a time of an EOF field in the A-MPDU for the EDMG STA until a beginning of the BA period. For example, controller 154 (FIG. 1) may be configured to allow the EDMG STA implemented by device 140 (FIG. 1) to be in the power save mode during the first power save period from the time of the EOF field in the A-MPDU for device 140 (FIG. 1) until a beginning of the BA period for device 140 (FIG. 1), e.g., as described above.

As indicated at block 608, the method may include transmitting the BA to the EDMG MU-MIMO initiator. For example, controller 154 (FIG. 1) may be configured to cause, trigger, and/or control the EDMG STA implemented by device 140 (FIG. 1) to transmit the BA to device 102 (FIG. 1), e.g., as described above.

As indicated at block 610, the method may include allowing the EDMG STA to be in the power save mode during a second power save period after transmission of the BA. For example, controller 154 (FIG. 1) may be configured to allow the EDMG STA implemented by device 140 (FIG. 1) to be in the power save mode during the second power save period after transmission of the BA, e.g., as described above.

Figure 7:
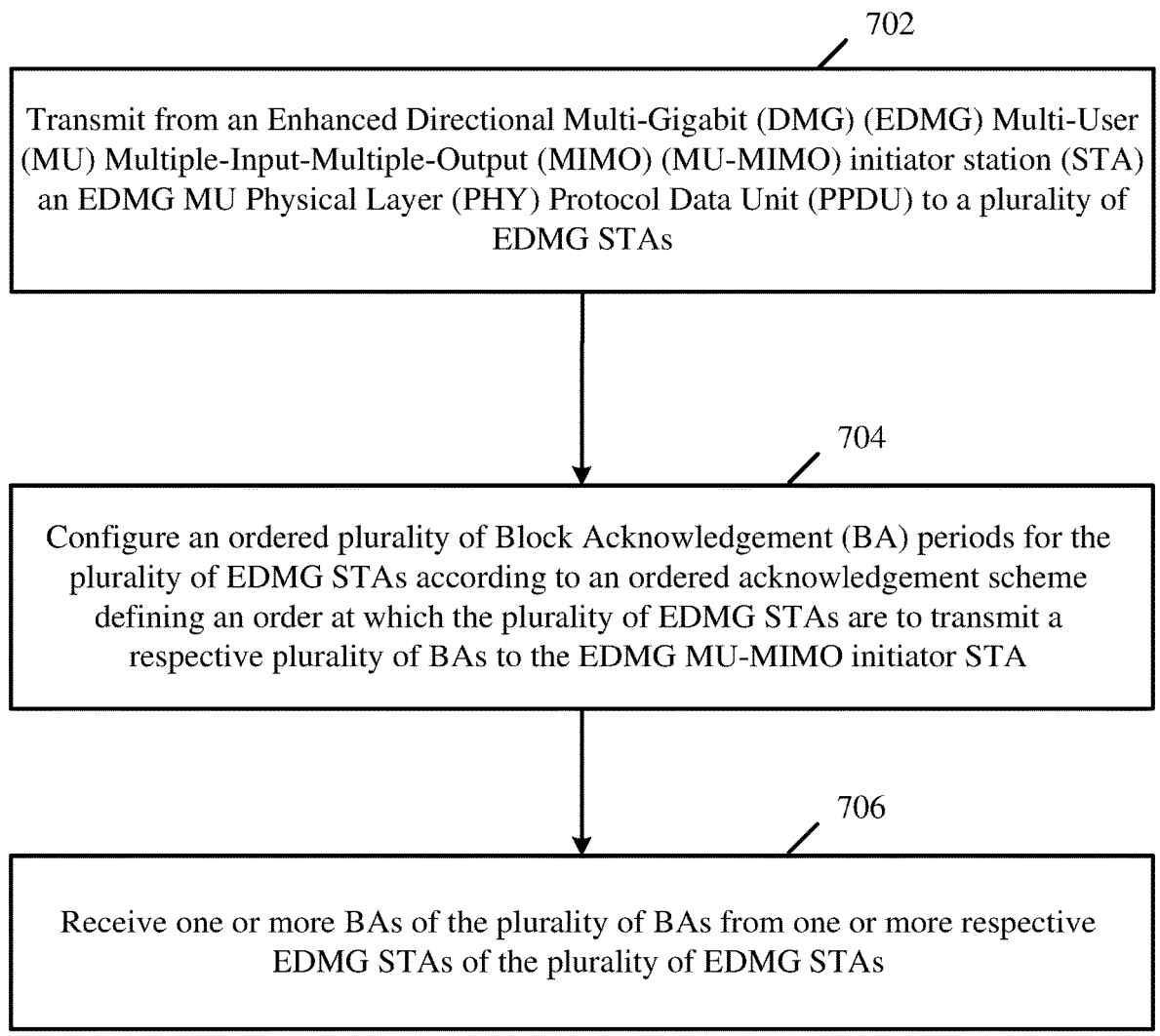
FIG. 7 is a schematic flow-chart illustration of a method of acknowledging a MU-MIMO transmission, in accordance with some demonstrative embodiments.

Reference is made to FIG. 7, which schematically illustrates a method of acknowledging a MU-MIMO transmission, in accordance with some demonstrative embodiments. For example, one or more of the operations of the method of FIG. 7 may be performed by one or more elements of a system, e.g., system 100 (FIG. 1), for example, one or more wireless devices, e.g., device 102 (FIG. 1), device 140 (FIG. 1), and/or device 160 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 702, the method may include transmitting an EDMG MU PPDU from an EDMG MU-MIMO initiator STA to a plurality of EDMG STAs. For example, controller 124 (FIG. 1) may be configured to cause, trigger, and/or control the wireless station implemented by device 102 (FIG. 1) to transmit the EDMG MU PPDU to the plurality of EDMG STAs, for example, including devices 140 and/or 160 (FIG. 1), e.g., as described above.

As indicated at block 704, the method may include configuring an ordered plurality of BA periods for the plurality of EDMG STAs according to an ordered acknowledgement scheme defining an order at which the plurality of EDMG STAs are to transmit a respective plurality of BAs to the EDMG MU-MIMO initiator STA. For example, controller 124 (FIG. 1) may be configured to cause, trigger, and/or control the wireless station implemented by device 102 (FIG. 1) to configure the ordered plurality of BA periods for the plurality of EDMG STAs according to the ordered acknowledgement scheme defining the order at which the plurality of EDMG STAs are to transmit the respective plurality of BAs to device 102 (FIG. 1), e.g., as described above.

As indicated at block 706, the method may include receiving one or more BAs of the plurality of BAs from one or more respective EDMG STAs of the plurality of EDMG STAs. For example, controller 124 (FIG. 1) may be configured to cause, trigger, and/or control the wireless station implemented by device 102 (FIG. 1) to receive the one or more BAs from devices 140 and/or 160 (FIG. 1), e.g., as described above.

Figure 8:
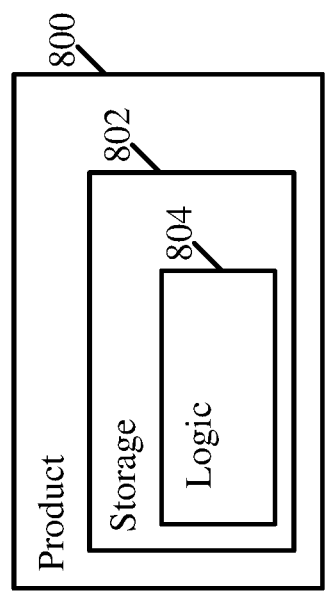
FIG. 8 is a schematic illustration of a product of manufacture, in accordance with some demonstrative embodiments.

Reference is made to FIG. 8, which schematically illustrates a product of manufacture 800, in accordance with some demonstrative embodiments. Product 800 may include one or more tangible computer-readable ("machine-readable") non-transitory storage media 802, which may include computer-executable instructions, e.g., implemented by logic 804, operable to, when executed by at least one computer processor, enable the at least one computer processor to implement one or more operations at device 102 (FIG. 1), device 140 (FIG. 1), device 160 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), device 160 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1) to perform, trigger and/or implement one or more operations and/or functionalities, and/or to perform, trigger and/or implement one or more operations and/or functionalities described with reference to the FIGS. 1, 2, 3, 5, 6, and/or 7, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 800 and/or machine readable storage media 802 may include one or more types of computer-readable storage media capable of storing data, including volatile memory, non-volatile memory, removable or non-removable memory, erasable or non-erasable memory, writeable or rewriteable memory, and the like. For example, machine readable storage media 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause an Enhanced Directional Multi-Gigabit (DMG) (EDMG) station (STA) to receive an Aggregate Medium Access Control (MAC) Protocol Data Unit (A-MPDU) for the EDMG STA in an EDMG Multi User (MU) Physical Layer (PHY) Protocol Data Unit (PPDU) from an EDMG MU Multiple-Input-Multiple-Output (MIMO) (MU-MIMO) initiator station; determine, according to an ordered acknowledgement scheme, a Block Acknowledgement (BA) period in which the EDMG STA is to be awake to allow transmission of a Block Acknowledgement (BA) from the EDMG STA to the EDMG MU-MIMO initiator STA; allow the EDMG STA to be in a power save mode during a first power save period from a time of an End of Frame (EOF) field in the A-MPDU for the EDMG STA until a beginning of the BA period; transmit the BA to the EDMG MU-MIMO initiator; and allow the EDMG STA to be in the power save mode during a second power save period after transmission of the BA.

Example 2 includes the subject matter of Example 1, and optionally, wherein the second power save period is to begin immediately after transmission of the BA and to continue until an end of an acknowledgement period, the acknowledgement period comprising a plurality of BA periods ordered according to the ordered acknowledgement scheme.

Example 3 includes the subject matter of Example 2, and optionally, wherein the apparatus is configured to cause the EDMG STA to be in an awake mode to be able to receive a BA Request (BAR) from the EDMG MU-MIMO initiator after the end of the acknowledgement period.

Example 4 includes the subject matter of Example 1, and optionally, wherein the second power save period is to begin a BA confirmation time after transmission of the BA and to continue until an end of an acknowledgement period, the acknowledgement period comprising a plurality of BA periods ordered according to the ordered acknowledgement scheme.

Example 5 includes the subject matter of any one of Examples 1-4, and optionally, wherein the apparatus is configured to cause the EDMG STA to determine the BA period according to a BA order indicated by the EDMG MU-MIMO initiator STA.

Example 6 includes the subject matter of any one of Examples 1-5, and optionally, wherein the apparatus is configured to cause the EDMG STA to receive a Block Acknowledgement Request (BAR) from the EDMG MU-MIMO initiator STA during the BA period, and to transmit the BA in response to the BAR.

Example 7 includes the subject matter of any one of Examples 1-6, and optionally, wherein the apparatus is configured to cause the EDMG STA to determine a beginning of the BA period based on an order of EDMG STAs indicated in a group description, from the EDMG MU-MIMO initiator STA, of a MU group comprising the EDMG STA.

Example 8 includes the subject matter of any one of Examples 1-7, and optionally, wherein the apparatus is configured to cause the EDMG STA to determine a beginning of the BA period based on a predefined Modulation and Coding Scheme (MCS) value allowed for transmission of the BA.

Example 9 includes the subject matter of any one of Examples 1-8, and optionally, wherein the apparatus is configured to cause the EDMG STA to receive the A-MPDU and to transmit the BA over a channel bandwidth in a frequency band above 45 Gigahertz (GHz).

Example 10 includes the subject matter of any one of Examples 1-9, and optionally, wherein the apparatus is configured to cause the EDMG STA to receive the A-MPDU and to transmit the BA over a channel bandwidth of at least 2.16 Gigahertz (GHz).

Example 11 includes the subject matter of any one of Examples 1-10, and optionally, comprising a radio.

Example 12 includes the subject matter of any one of Examples 1-11, and optionally, comprising one or more antennas.

Example 13 includes a system of wireless communication comprising an Enhanced Directional Multi-Gigabit (DMG) (EDMG) station (STA), the EDMG STA comprising one or more antennas; a radio; a memory; a processor; and a controller configured to cause the EDMG STA to receive an Aggregate Medium Access Control (MAC) Protocol Data Unit (A-MPDU) for the EDMG STA in an EDMG Multi User (MU) Physical Layer (PHY) Protocol Data Unit (PPDU) from an EDMG MU Multiple-Input-Multiple-Output (MIMO) (MU-MIMO) initiator station; determine, according to an ordered acknowledgement scheme, a Block Acknowledgement (BA) period in which the EDMG STA is to be awake to allow transmission of a Block Acknowledgement (BA) from the EDMG STA to the EDMG MU-MIMO initiator STA; allow the EDMG STA to be in a power save mode during a first power save period from a time of an End of Frame (EOF) field in the A-MPDU for the EDMG STA until a beginning of the BA period; transmit the BA to the EDMG MU-MIMO initiator; and allow the EDMG STA to be in the power save mode during a second power save period after transmission of the BA.

Example 14 includes the subject matter of Example 13, and optionally, wherein the second power save period is to begin immediately after transmission of the BA and to continue until an end of an acknowledgement period, the acknowledgement period comprising a plurality of BA periods ordered according to the ordered acknowledgement scheme.

Example 15 includes the subject matter of Example 14, and optionally, wherein the controller is configured to cause the EDMG STA to be in an awake mode to be able to receive a BA Request (BAR) from the EDMG MU-MIMO initiator after the end of the acknowledgement period.

Example 16 includes the subject matter of Example 13, and optionally, wherein the second power save period is to begin a BA confirmation time after transmission of the BA and to continue until an end of an acknowledgement period, the acknowledgement period comprising a plurality of BA periods ordered according to the ordered acknowledgement scheme.

Example 17 includes the subject matter of any one of Examples 13-16, and optionally, wherein the controller is configured to cause the EDMG STA to determine the BA period according to a BA order indicated by the EDMG MU-MIMO initiator STA.

Example 18 includes the subject matter of any one of Examples 13-17, and optionally, wherein the controller is configured to cause the EDMG STA to receive a Block Acknowledgement Request (BAR) from the EDMG MU-MIMO initiator STA during the BA period, and to transmit the BA in response to the BAR.

Example 19 includes the subject matter of any one of Examples 13-18, and optionally, wherein the controller is configured to cause the EDMG STA to determine a beginning of the BA period based on an order of EDMG STAs indicated in a group description, from the EDMG MU-MIMO initiator STA, of a MU group comprising the EDMG STA.

Example 20 includes the subject matter of any one of Examples 13-19, and optionally, wherein the controller is configured to cause the EDMG STA to determine a beginning of the BA period based on a predefined Modulation and Coding Scheme (MCS) value allowed for transmission of the BA.

Example 21 includes the subject matter of any one of Examples 13-20, and optionally, wherein the controller is configured to cause the EDMG STA to receive the A-MPDU and to transmit the BA over a channel bandwidth in a frequency band above 45 Gigahertz (GHz).

Example 22 includes the subject matter of any one of Examples 13-21, and optionally, wherein the controller is configured to cause the EDMG STA to receive the A-MPDU and to transmit the BA over a channel bandwidth of at least 2.16 Gigahertz (GHz).

Example 23 includes a method to be performed at an Enhanced Directional Multi-Gigabit (DMG) (EDMG) station (STA), the method comprising receiving an Aggregate Medium Access Control (MAC) Protocol Data Unit (A-MPDU) for the EDMG STA in an EDMG Multi User (MU) Physical Layer (PHY) Protocol Data Unit (PPDU) from an EDMG MU Multiple-Input-Multiple-Output (MIMO) (MU-MIMO) initiator station; determining, according to an ordered acknowledgement scheme, a Block Acknowledgement (BA) period in which the EDMG STA is to be awake to allow transmission of a Block Acknowledgement (BA) from the EDMG STA to the EDMG MU-MIMO initiator STA; allowing the EDMG STA to be in a power save mode during a first power save period from a time of an End of Frame (EOF) field in the A-MPDU for the EDMG STA until a beginning of the BA period; transmitting the BA to the EDMG MU-MIMO initiator; and allowing the EDMG STA to be in the power save mode during a second power save period after transmission of the BA.

Example 24 includes the subject matter of Example 23, and optionally, wherein the second power save period is to begin immediately after transmission of the BA and to continue until an end of an acknowledgement period, the acknowledgement period comprising a plurality of BA periods ordered according to the ordered acknowledgement scheme.

Example 25 includes the subject matter of Example 24, and optionally, comprising causing the EDMG STA to be in an awake mode to be able to receive a BA Request (BAR) from the EDMG MU-MIMO initiator after the end of the acknowledgement period.

Example 26 includes the subject matter of Example 23, and optionally, wherein the second power save period is to begin a BA confirmation time after transmission of the BA and to continue until an end of an acknowledgement period, the acknowledgement period comprising a plurality of BA periods ordered according to the ordered acknowledgement scheme.

Example 27 includes the subject matter of any one of Examples 23-26, and optionally, comprising determining the BA period according to a BA order indicated by the EDMG MU-MIMO initiator STA.

Example 28 includes the subject matter of any one of Examples 23-27, and optionally, comprising receiving a Block Acknowledgement Request (BAR) from the EDMG MU-MIMO initiator STA during the BA period, and transmitting the BA in response to the BAR.

Example 29 includes the subject matter of any one of Examples 23-28, and optionally, comprising determining a beginning of the BA period based on an order of EDMG STAs indicated in a group description, from the EDMG MU-MIMO initiator STA, of a MU group comprising the EDMG STA.

Example 30 includes the subject matter of any one of Examples 23-29, and optionally, comprising determining a beginning of the BA period based on a predefined Modulation and Coding Scheme (MCS) value allowed for transmission of the BA.

Example 31 includes the subject matter of any one of Examples 23-30, and optionally, comprising receiving the A-MPDU and transmitting the BA over a channel bandwidth in a frequency band above 45 Gigahertz (GHz).

Example 32 includes the subject matter of any one of Examples 23-31, and optionally, comprising receiving the A-MPDU and transmitting the BA over a channel bandwidth of at least 2.16 Gigahertz (GHz).

Example 33 includes a product comprising one or more tangible computer-readable non-transitory storage media comprising computer-executable instructions operable to, when executed by at least one processor, enable the at least one processor to cause an Enhanced Directional Multi-Gigabit (DMG) (EDMG) station (STA) to receive an Aggregate Medium Access Control (MAC) Protocol Data Unit (A-MPDU) for the EDMG STA in an EDMG Multi User (MU) Physical Layer (PHY) Protocol Data Unit (PPDU) from an EDMG MU Multiple-Input-Multiple-Output (MIMO) (MU-MIMO) initiator station; determine, according to an ordered acknowledgement scheme, a Block Acknowledgement (BA) period in which the EDMG STA is to be awake to allow transmission of a Block Acknowledgement (BA) from the EDMG STA to the EDMG MU-MIMO initiator STA; allow the EDMG STA to be in a power save mode during a first power save period from a time of an End of Frame (EOF) field in the A-MPDU for the EDMG STA until a beginning of the BA period; transmit the BA to the EDMG MU-MIMO initiator; and allow the EDMG STA to be in the power save mode during a second power save period after transmission of the BA.

Example 34 includes the subject matter of Example 33, and optionally, wherein the second power save period is to begin immediately after transmission of the BA and to continue until an end of an acknowledgement period, the acknowledgement period comprising a plurality of BA periods ordered according to the ordered acknowledgement scheme.

Example 35 includes the subject matter of Example 34, and optionally, wherein the instructions, when executed, cause the EDMG STA to be in an awake mode to be able to receive a BA Request (BAR) from the EDMG MU-MIMO initiator after the end of the acknowledgement period.

Example 36 includes the subject matter of Example 33, and optionally, wherein the second power save period is to begin a BA confirmation time after transmission of the BA and to continue until an end of an acknowledgement period, the acknowledgement period comprising a plurality of BA periods ordered according to the ordered acknowledgement scheme.

Example 37 includes the subject matter of any one of Examples 33-36, and optionally, wherein the instructions, when executed, cause the EDMG STA to determine the BA period according to a BA order indicated by the EDMG MU-MIMO initiator STA.

Example 38 includes the subject matter of any one of Examples 33-37, and optionally, wherein the instructions, when executed, cause the EDMG STA to receive a Block Acknowledgement Request (BAR) from the EDMG MU-MIMO initiator STA during the BA period, and to transmit the BA in response to the BAR.

Example 39 includes the subject matter of any one of Examples 33-38, and optionally, wherein the instructions, when executed, cause the EDMG STA to determine a beginning of the BA period based on an order of EDMG STAs indicated in a group description, from the EDMG MU-MIMO initiator STA, of a MU group comprising the EDMG STA.

Example 40 includes the subject matter of any one of Examples 33-39, and optionally, wherein the instructions, when executed, cause the EDMG STA to determine a beginning of the BA period based on a predefined Modulation and Coding Scheme (MCS) value allowed for transmission of the BA.

Example 41 includes the subject matter of any one of Examples 33-40, and optionally, wherein the instructions, when executed, cause the EDMG STA to receive the A-MPDU and to transmit the BA over a channel bandwidth in a frequency band above 45 Gigahertz (GHz).

Example 42 includes the subject matter of any one of Examples 33-41, and optionally, wherein the instructions, when executed, cause the EDMG STA to receive the A-MPDU and to transmit the BA over a channel bandwidth of at least 2.16 Gigahertz (GHz).

Example 43 includes an apparatus of wireless communication by an Enhanced Directional Multi-Gigabit (DMG) (EDMG) station (STA), the apparatus comprising means for receiving an Aggregate Medium Access Control (MAC) Protocol Data Unit (A-MPDU) for the EDMG STA in an EDMG Multi User (MU) Physical Layer (PHY) Protocol Data Unit (PPDU) from an EDMG MU Multiple-Input-Multiple-Output (MIMO) (MU-MIMO) initiator station; means for determining, according to an ordered acknowledgement scheme, a Block Acknowledgement (BA) period in which the EDMG STA is to be awake to allow transmission of a Block Acknowledgement (BA) from the EDMG STA to the EDMG MU-MIMO initiator STA; means for allowing the EDMG STA to be in a power save mode during a first power save period from a time of an End of Frame (EOF) field in the A-MPDU for the EDMG STA until a beginning of the BA period; means for transmitting the BA to the EDMG MU-MIMO initiator; and means for allowing the EDMG STA to be in the power save mode during a second power save period after transmission of the BA.

Example 44 includes the subject matter of Example 43, and optionally, wherein the second power save period is to begin immediately after transmission of the BA and to continue until an end of an acknowledgement period, the acknowledgement period comprising a plurality of BA periods ordered according to the ordered acknowledgement scheme.

Example 45 includes the subject matter of Example 44, and optionally, comprising means for causing the EDMG STA to be in an awake mode to be able to receive a BA Request (BAR) from the EDMG MU-MIMO initiator after the end of the acknowledgement period.

Example 46 includes the subject matter of Example 43, and optionally, wherein the second power save period is to begin a BA confirmation time after transmission of the BA and to continue until an end of an acknowledgement period, the acknowledgement period comprising a plurality of BA periods ordered according to the ordered acknowledgement scheme.

Example 47 includes the subject matter of any one of Examples 43-46, and optionally, comprising means for determining the BA period according to a BA order indicated by the EDMG MU-MIMO initiator STA.

Example 48 includes the subject matter of any one of Examples 43-47, and optionally, comprising means for receiving a Block Acknowledgement Request (BAR) from the EDMG MU-MIMO initiator STA during the BA period, and transmitting the BA in response to the BAR.

Example 49 includes the subject matter of any one of Examples 43-48, and optionally, comprising means for determining a beginning of the BA period based on an order of EDMG STAs indicated in a group description, from the EDMG MU-MIMO initiator STA, of a MU group comprising the EDMG STA.

Example 50 includes the subject matter of any one of Examples 43-49, and optionally, comprising means for determining a beginning of the BA period based on a predefined Modulation and Coding Scheme (MCS) value allowed for transmission of the BA.

Example 51 includes the subject matter of any one of Examples 43-50, and optionally, comprising means for receiving the A-MPDU and transmitting the BA over a channel bandwidth in a frequency band above 45 Gigahertz (GHz).

Example 52 includes the subject matter of any one of Examples 43-51, and optionally, comprising means for receiving the A-MPDU and transmitting the BA over a channel bandwidth of at least 2.16 Gigahertz (GHz).

Example 53 includes an apparatus comprising logic and circuitry configured to cause an Enhanced Directional Multi-Gigabit (DMG) (EDMG) Multi-User (MU) Multiple-Input-Multiple-Output (MIMO) (MU-MIMO) initiator station (STA) to transmit an EDMG MU Physical Layer (PHY) Protocol Data Unit (PPDU) to a plurality of EDMG STAs; configure an ordered plurality of Block Acknowledgement (BA) periods for the plurality of EDMG STAs according to an ordered acknowledgement scheme defining an order at which the plurality of EDMG STAs are to transmit a respective plurality of BAs to the EDMG MU-MIMO initiator STA; and receive one or more BAs of the plurality of BAs from one or more respective EDMG STAs of the plurality of EDMG STAs.

Example 54 includes the subject matter of Example 53, and optionally, wherein the apparatus is configured to cause the EDMG MU-MIMO initiator STA to transmit a BA Request (BAR) to an EDMG STA from which a BA is not received, the BAR to be transmitted after an acknowledgement period comprising the ordered plurality of BA periods.

Example 55 includes the subject matter of Example 53, and optionally, wherein the apparatus is configured to cause the EDMG MU-MIMO initiator STA to transmit a BA Request (BAR) to an EDMG STA from which a BA is not received in a BA period for the EDMG STA, the BAR to be transmitted immediately after the BA period for the EDMG STA.

Example 56 includes the subject matter of any one of Examples 53-55, and optionally, wherein the apparatus is configured to cause the EDMG MU-MIMO initiator STA to transmit to the plurality of EDMG STAs an indication of the ordered plurality of BA periods.

Example 57 includes the subject matter of any one of Examples 53-56, and optionally, wherein the apparatus is configured to cause the EDMG MU-MIMO initiator STA to transmit a BA Request (BAR) to an EDMG STA during a BA period for the EDMG STA, and to receive a BA from the EDMG STA in response to the BAR.

Example 58 includes the subject matter of any one of Examples 53-57, and optionally, wherein the apparatus is configured to cause the EDMG MU-MIMO initiator STA to configure the ordered plurality of BA periods according to an order of the plurality of EDMG STAs indicated in a group description of a MU group comprising the plurality of EDMG STAs.

Example 59 includes the subject matter of any one of Examples 53-58, and optionally, wherein the apparatus is configured to cause the EDMG MU-MIMO initiator STA to transmit the EDMG MU PPDU and to receive the one or more BAs over a channel bandwidth in a frequency band above 45 Gigahertz (GHz).

Example 60 includes the subject matter of any one of Examples 53-59, and optionally, wherein the apparatus is configured to cause the EDMG MU-MIMO initiator STA to transmit the EDMG MU PPDU and to receive the one or more BAs over a channel bandwidth of at least 2.16 Gigahertz (GHz).

Example 61 includes the subject matter of any one of Examples 53-60, and optionally, comprising a radio.

Example 62 includes the subject matter of any one of Examples 53-61, and optionally, comprising one or more antennas.

Example 63 includes a system of wireless communication comprising an Enhanced Directional Multi-Gigabit (DMG) (EDMG) Multi-User (MU) Multiple-Input-Multiple-Output (MIMO) (MU-MIMO) initiator station (STA), the EDMG MU-MIMO STA comprising one or more antennas; a radio; a memory; a processor; and a controller configured to cause the EDMG MU-MIMO STA to transmit an EDMG MU Physical Layer (PHY) Protocol Data Unit (PPDU) to a plurality of EDMG STAs; configure an ordered plurality of Block Acknowledgement (BA) periods for the plurality of EDMG STAs according to an ordered acknowledgement scheme defining an order at which the plurality of EDMG STAs are to transmit a respective plurality of BAs to the EDMG MU-MIMO initiator STA; and receive one or more BAs of the plurality of BAs from one or more respective EDMG STAs of the plurality of EDMG STAs.

Example 64 includes the subject matter of Example 63, and optionally, wherein the controller is configured to cause the EDMG MU-MIMO initiator STA to transmit a BA Request (BAR) to an EDMG STA from which a BA is not received, the BAR to be transmitted after an acknowledgement period comprising the ordered plurality of BA periods.

Example 65 includes the subject matter of Example 63, and optionally, wherein the controller is configured to cause the EDMG MU-MIMO initiator STA to transmit a BA Request (BAR) to an EDMG STA from which a BA is not received in a BA period for the EDMG STA, the BAR to be transmitted immediately after the BA period for the EDMG STA.

Example 66 includes the subject matter of any one of Examples 63-65, and optionally, wherein the controller is configured to cause the EDMG MU-MIMO initiator STA to transmit to the plurality of EDMG STAs an indication of the ordered plurality of BA periods.

Example 67 includes the subject matter of any one of Examples 63-66, and optionally, wherein the controller is configured to cause the EDMG MU-MIMO initiator STA to transmit a BA Request (BAR) to an EDMG STA during a BA period for the EDMG STA, and to receive a BA from the EDMG STA in response to the BAR.

Example 68 includes the subject matter of any one of Examples 63-67, and optionally, wherein the controller is configured to cause the EDMG MU-MIMO initiator STA to configure the ordered plurality of BA periods according to an order of the plurality of EDMG STAs indicated in a group description of a MU group comprising the plurality of EDMG STAs.

Example 69 includes the subject matter of any one of Examples 63-68, and optionally, wherein the controller is configured to cause the EDMG MU-MIMO initiator STA to transmit the EDMG MU PPDU and to receive the one or more BAs over a channel bandwidth in a frequency band above 45 Gigahertz (GHz).

Example 70 includes the subject matter of any one of Examples 63-69, and optionally, wherein the controller is configured to cause the EDMG MU-MIMO initiator STA to transmit the EDMG MU PPDU and to receive the one or more BAs over a channel bandwidth of at least 2.16 Gigahertz (GHz).

Example 71 includes a method to be performed at an Enhanced Directional Multi-Gigabit (DMG) (EDMG) Multi-User (MU) Multiple-Input-Multiple-Output (MIMO) (MU-MIMO) initiator station (STA), the method comprising transmitting an EDMG MU Physical Layer (PHY) Protocol Data Unit (PPDU) to a plurality of EDMG STAs; configuring an ordered plurality of Block Acknowledgement (BA) periods for the plurality of EDMG STAs according to an ordered acknowledgement scheme defining an order at which the plurality of EDMG STAs are to transmit a respective plurality of BAs to the EDMG MU-MIMO initiator STA; and receiving one or more BAs of the plurality of BAs from one or more respective EDMG STAs of the plurality of EDMG STAs.

Example 72 includes the subject matter of Example 71, and optionally, comprising transmitting a BA Request (BAR) to an EDMG STA from which a BA is not received, the BAR to be transmitted after an acknowledgement period comprising the ordered plurality of BA periods.

Example 73 includes the subject matter of Example 71, and optionally, comprising transmitting a BA Request (BAR) to an EDMG STA from which a BA is not received in a BA period for the EDMG STA, the BAR to be transmitted immediately after the BA period for the EDMG STA.

Example 74 includes the subject matter of any one of Examples 71-73, and optionally, comprising transmitting to the plurality of EDMG STAs an indication of the ordered plurality of BA periods.

Example 75 includes the subject matter of any one of Examples 71-74, and optionally, comprising transmitting a BA Request (BAR) to an EDMG STA during a BA period for the EDMG STA, and receiving a BA from the EDMG STA in response to the BAR.

Example 76 includes the subject matter of any one of Examples 71-75, and optionally, comprising configuring the ordered plurality of BA periods according to an order of the plurality of EDMG STAs indicated in a group description of a MU group comprising the plurality of EDMG STAs.

Example 77 includes the subject matter of any one of Examples 71-76, and optionally, comprising transmitting the EDMG MU PPDU and receiving the one or more BAs over a channel bandwidth in a frequency band above 45 Gigahertz (GHz).

Example 78 includes the subject matter of any one of Examples 71-77, and optionally, comprising transmitting the EDMG MU PPDU and receiving the one or more BAs over a channel bandwidth of at least 2.16 Gigahertz (GHz).

Example 79 includes a product comprising one or more tangible computer-readable non-transitory storage media comprising computer-executable instructions operable to, when executed by at least one processor, enable the at least one processor to cause an Enhanced Directional Multi-Gigabit (DMG) (EDMG) Multi-User (MU) Multiple-Input-Multiple-Output (MIMO) (MU-MIMO) initiator station (STA) to transmit an EDMG MU Physical Layer (PHY) Protocol Data Unit (PPDU) to a plurality of EDMG STAs; configure an ordered plurality of Block Acknowledgement (BA) periods for the plurality of EDMG STAs according to an ordered acknowledgement scheme defining an order at which the plurality of EDMG STAs are to transmit a respective plurality of BAs to the EDMG MU-MIMO initiator STA; and receive one or more BAs of the plurality of BAs from one or more respective EDMG STAs of the plurality of EDMG STAs.

Example 80 includes the subject matter of Example 79, and optionally, wherein the instructions, when executed, cause the EDMG MU-MIMO initiator STA to transmit a BA Request (BAR) to an EDMG STA from which a BA is not received, the BAR to be transmitted after an acknowledgement period comprising the ordered plurality of BA periods.

Example 81 includes the subject matter of Example 79, and optionally, wherein the instructions, when executed, cause the EDMG MU-MIMO initiator STA to transmit a BA Request (BAR) to an EDMG STA from which a BA is not received in a BA period for the EDMG STA, the BAR to be transmitted immediately after the BA period for the EDMG STA.

Example 82 includes the subject matter of any one of Examples 79-81, and optionally, wherein the instructions, when executed, cause the EDMG MU-MIMO initiator STA to transmit to the plurality of EDMG STAs an indication of the ordered plurality of BA periods.

Example 83 includes the subject matter of any one of Examples 79-82, and optionally, wherein the instructions, when executed, cause the EDMG MU-MIMO initiator STA to transmit a BA Request (BAR) to an EDMG STA during a BA period for the EDMG STA, and to receive a BA from the EDMG STA in response to the BAR.

Example 84 includes the subject matter of any one of Examples 79-83, and optionally, wherein the instructions, when executed, cause the EDMG MU-MIMO initiator STA to configure the ordered plurality of BA periods according to an order of the plurality of EDMG STAs indicated in a group description of a MU group comprising the plurality of EDMG STAs.

Example 85 includes the subject matter of any one of Examples 79-84, and optionally, wherein the instructions, when executed, cause the EDMG MU-MIMO initiator STA to transmit the EDMG MU PPDU and to receive the one or more BAs over a channel bandwidth in a frequency band above 45 Gigahertz (GHz).

Example 86 includes the subject matter of any one of Examples 79-85, and optionally, wherein the instructions, when executed, cause the EDMG MU-MIMO initiator STA to transmit the EDMG MU PPDU and to receive the one or more BAs over a channel bandwidth of at least 2.16 Gigahertz (GHz).

Example 87 includes an apparatus of wireless communication by an Enhanced Directional Multi-Gigabit (DMG) (EDMG) Multi-User (MU) Multiple-Input-Multiple-Output (MIMO) (MU-MIMO) initiator station (STA), the apparatus comprising means for transmitting an EDMG MU Physical Layer (PHY) Protocol Data Unit (PPDU) to a plurality of EDMG STAs; means for configuring an ordered plurality of Block Acknowledgement (BA) periods for the plurality of EDMG STAs according to an ordered acknowledgement scheme defining an order at which the plurality of EDMG STAs are to transmit a respective plurality of BAs to the EDMG MU-MIMO initiator STA; and means for receiving one or more BAs of the plurality of BAs from one or more respective EDMG STAs of the plurality of EDMG STAs.

Example 88 includes the subject matter of Example 87, and optionally, comprising means for transmitting a BA Request (BAR) to an EDMG STA from which a BA is not received, the BAR to be transmitted after an acknowledgement period comprising the ordered plurality of BA periods.

Example 89 includes the subject matter of Example 87, and optionally, comprising means for transmitting a BA Request (BAR) to an EDMG STA from which a BA is not received in a BA period for the EDMG STA, the BAR to be transmitted immediately after the BA period for the EDMG STA.

Example 90 includes the subject matter of any one of Examples 87-89, and optionally, comprising means for transmitting to the plurality of EDMG STAs an indication of the ordered plurality of BA periods.

Example 91 includes the subject matter of any one of Examples 87-90, and optionally, comprising means for transmitting a BA Request (BAR) to an EDMG STA during a BA period for the EDMG STA, and receiving a BA from the EDMG STA in response to the BAR.

Example 92 includes the subject matter of any one of Examples 87-91, and optionally, comprising means for configuring the ordered plurality of BA periods according to an order of the plurality of EDMG STAs indicated in a group description of a MU group comprising the plurality of EDMG STAs.

Example 93 includes the subject matter of any one of Examples 87-92, and optionally, comprising means for transmitting the EDMG MU PPDU and receiving the one or more BAs over a channel bandwidth in a frequency band above 45 Gigahertz (GHz).

Example 94 includes the subject matter of any one of Examples 87-93, and optionally, comprising means for transmitting the EDMG MU PPDU and receiving the one or more BAs over a channel bandwidth of at least 2.16 Gigahertz (GHz).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   a processor comprising logic and circuitry configured to cause an Enhanced Directional Multi-Gigabit (DMG) (EDMG) wireless communication station (STA) to:
   process an Aggregate Medium Access Control (MAC) Protocol Data Unit (A-MPDU) for the EDMG STA in an EDMG Multi User (MU) Physical Layer (PHY) Protocol Data Unit (PPDU) from an EDMG MU Multiple-Input-Multiple-Output (MIMO) (MU-MIMO) initiator;
   schedule a first period during which the EDMG STA is allowed to be in a power save mode, the first period is from an end of the A-MPDU for the EDMG STA;
   transmit a Block Acknowledgement (BA) to the EDMG MU-MIMO initiator during a BA period after the first period; and
   schedule a second period during which the EDMG STA is allowed to be in the power save mode, the second period is after transmission of the BA; and
   a memory to store information processed by the processor.

2. The apparatus of claim 1, wherein the second period is to begin immediately after transmission of the BA.

3. The apparatus of claim 1, wherein the second period is to end at an end of a time period, which covers a sequence of a plurality of BA periods corresponding to a respective plurality of EDMG STAs.

4. The apparatus of claim 3 configured to cause the EDMG STA to process a BA Request (BAR) received from the EDMG MU-MIMO initiator after the time period, the BAR to request the EDMG STA to acknowledge the A-MPDU for the EDMG STA.

5. The apparatus of claim 1, wherein an end of the second period is based on an end of the EDMG MU PPDU.

6. The apparatus of claim 1 configured to cause the EDMG STA to process a BA Request (BAR) received from the EDMG MU-MIMO initiator after the second period, the BAR to request the EDMG STA to acknowledge the A-MPDU for the EDMG STA.

7. The apparatus of claim 1 configured to cause the EDMG STA to be awake after the second period.

8. The apparatus of claim 1 configured to cause the EDMG STA to determine the beginning of the BA period based on information from the EDMG MU-MIMO initiator.

9. The apparatus of claim 1, wherein the BA period is based on a predefined Modulation and Coding Scheme (MCS) value.

10. The apparatus of claim 9, wherein the predefined MCS value is 0.

11. The apparatus of claim 1 configured to cause the EDMG STA to receive the A-MPDU and to transmit the BA over a channel bandwidth of at least 2.16 Gigahertz (GHz) in a frequency band above 45 GHz.

12. The apparatus of claim 1 comprising a radio, the processor configured to cause the radio to transmit the BA.

13. The apparatus of claim 12 comprising one or more antennas connected to the radio, and another processor to execute instructions of an operating system.

14. A product comprising one or more tangible computer-readable non-transitory storage media comprising computer-executable instructions operable to, when executed by at least one processor, enable the at least one processor to cause an Enhanced Directional Multi-Gigabit (DMG) (EDMG) wireless communication station (STA) to:

process an Aggregate Medium Access Control (MAC) Protocol Data Unit (A-MPDU) for the EDMG STA in an EDMG Multi User (MU) Physical Layer (PHY) Protocol Data Unit (PPDU) from an EDMG MU Multiple-Input-Multiple-Output (MIMO) (MU-MIMO) initiator;

schedule a first period during which the EDMG STA is allowed to be in a power save mode, the first period is from an end of the A-MPDU for the EDMG STA;

transmit a Block Acknowledgement (BA) to the EDMG MU-MIMO initiator during a BA period after the first period; and schedule a second period during which the EDMG STA is allowed to be in the power save mode, the second period is after transmission of the BA.

15. The product of claim 14, wherein the second period is to begin immediately after transmission of the BA.

16. The product of claim 14, wherein the second period is to end at an end of a time period, which covers a sequence of a plurality of BA periods corresponding to a respective plurality of EDMG STAs.

17. The product of claim 14, wherein the instructions, when executed, cause the EDMG STA to process a BA Request (BAR) received from the EDMG MU-MIMO initiator after the second period, the BAR to request the EDMG STA to acknowledge the A-MPDU for the EDMG STA.

18. The product of claim 14, wherein the instructions, when executed, cause the EDMG STA to determine the beginning of the BA period based on information from the EDMG MU-MIMO initiator.

19. The product of claim 14, wherein the BA period is based on a predefined Modulation and Coding Scheme (MCS) value.

20. The product of claim 14, wherein the instructions, when executed, cause the EDMG STA to receive the A-MPDU and to transmit the BA over a channel bandwidth of at least 2.16 Gigahertz (GHz) in a frequency band above 45 GHz.

21. An apparatus comprising:

means for causing an Enhanced Directional Multi-Gigabit (DMG) (EDMG) wireless communication station (STA) to process an Aggregate Medium Access Control (MAC) Protocol Data Unit (A-MPDU) for the EDMG STA in an EDMG Multi User (MU) Physical Layer (PHY) Protocol Data Unit (PPDU) from an EDMG MU Multiple-Input-Multiple-Output (MIMO) (MU-MIMO) initiator;

means for setting a first period during which the EDMG STA is allowed to be in a power save mode, the first period is from an end of the A-MPDU for the EDMG STA;

means for causing the EDMG STA to transmit a Block Acknowledgement (BA) to the EDMG MU-MIMO initiator during a BA period after the first period; and means for setting a second period during which the EDMG STA is allowed to be in the power save mode, the second period is after transmission of the BA.

22. The apparatus of claim 21 comprising means for causing the EDMG STA to determine the beginning of the BA period based on information from the EDMG MU-MIMO initiator.

* * * * *